(12) United States Patent
Shinohara et al.

(10) Patent No.: US 8,286,163 B2
(45) Date of Patent: Oct. 9, 2012

(54) COUPLING BETWEEN SERVER AND STORAGE APPARATUS USING DETECTED I/O ADAPTOR AND ALLOWING APPLICATION EXECUTION BASED ON ACCESS GROUP AND PORT CONNECTION GROUP IN VIRTUALIZED ENVIRONMENT

(75) Inventors: Daisuke Shinohara, Yokohama (JP); Norifumi Nishikawa, Machida (JP)

(73) Assignee: Hitachi, Ltd., Tokyo (JP)

( * ) Notice: Subject to any disclaimer, the term of this patent is extended or adjusted under 35 U.S.C. 154(b) by 561 days.

(21) Appl. No.: 12/492,810

(22) Filed: Jun. 26, 2009

(65) Prior Publication Data

US 2010/0275203 A1 Oct. 28, 2010

(30) Foreign Application Priority Data

Apr. 27, 2009 (JP) ................................. 2009-107289

(51) Int. Cl.
*G06F 9/455* (2006.01)
(52) U.S. Cl. .............................. 718/1; 718/104; 709/219
(58) Field of Classification Search .............. 718/1, 104; 709/219
See application file for complete search history.

(56) References Cited

U.S. PATENT DOCUMENTS

| | | | | |
|---|---|---|---|---|
| 6,802,062 B1* | 10/2004 | Oyamada et al. | ................. | 718/1 |
| 7,240,106 B2* | 7/2007 | Cochran et al. | ................ | 709/222 |
| 7,292,567 B2* | 11/2007 | Terrell et al. | ................... | 370/363 |
| 2002/0073297 A1* | 6/2002 | Mizuno et al. | ................ | 711/202 |
| 2004/0088402 A1* | 5/2004 | Piepho et al. | ................. | 709/224 |
| 2006/0174087 A1* | 8/2006 | Hashimoto et al. | ........... | 711/173 |
| 2007/0245114 A1* | 10/2007 | Kakui et al. | ................... | 711/170 |
| 2008/0222633 A1* | 9/2008 | Kami | ................. | 718/1 |
| 2008/0301396 A1* | 12/2008 | Hamada et al. | ............... | 711/202 |

FOREIGN PATENT DOCUMENTS

JP 2006-209487 A 8/2006

\* cited by examiner

*Primary Examiner* — Meng An
*Assistant Examiner* — Abu Z Ghaffari
(74) *Attorney, Agent, or Firm* — Foley & Lardner LLP

(57) ABSTRACT

The management computer creates a connection between a virtual computer and a logical volume of a storage apparatus based on the application management information that stores a connection relationship between an application program and an I/O adapter, before a server computer provided with a hypervisor that logically divides the computer resources that include a CPU, a memory, and an I/O adapter and that operates them as an independent virtual computer starts an application program that has been stored into the storage apparatus on the virtual computer.

10 Claims, 21 Drawing Sheets

FIG. 5A

| # | HBA ID | HBA WWN | LHBA ID | LHBA WWN | ALLOCATED DESTINATION |
|---|--------|---------|---------|----------|----------------------|
| 1 | PHBA-1 | WWN-1-P1-1 | LHBA-1-1 | WWN-L1 | VM-1 |
| 2 | PHBA-1 | WWN-1-P1-1 | LHBA-1-2 | WWN-L3 | VM-2 |
| 3 | PHBA-2 | WWN-1-P2-1 | LHBA-2-1 | WWN-L2 | VM-1 |
| 4 | PHBA-2 | WWN-1-P2-1 | LHBA-2-2 | WWN-L4 | VM-2 |
| 5 | PHBA-3 | WWN-1-P3-1 | | | |
| 6 | PHBA-4 | WWN-1-P4-1 | | | |
| | | | | | |

FIG. 5B

| # | CPU ID | FREQUENCY | LCPU ID | ALLOCATED AMOUNT | ALLOCATED DESTINATION |
|---|--------|-----------|---------|------------------|----------------------|
| 1 | PCPU-1 | 2.8 GHz | LCPU-1-1 | 50 % | VM-1 |
| 2 | PCPU-2 | 2.4 GHz | LCPU-2-1 | 50 % | VM-2 |
| 3 | PCPU-3 | 2.4 GHz | LCPU-3-1 | 50 % | VM-2 |
| 4 | PCPU-4 | 2.0 GHz | | | |
| | | | | | |

FIG. 5C

| # | MEM ID | SIZE | LMEM ID | ALLOCATED AMOUNT | ALLOCATED DESTINATION |
|---|--------|------|---------|------------------|----------------------|
| 1 | PMEM-1 | 4 GB | LMEM-1-1 | 25 % | VM-1 |
| 2 | PMEM-1 | 4 GB | LMEM-1-2 | 25 % | VM-2 |
| | | | | | |

FIG. 6

| # | AP ID | INTERNAL HBA ID | LHBA ID | LHBA WWN | LU INQ | INTERNAL VOL ID | HBA ID |
|---|---|---|---|---|---|---|---|
| 1 | VM-1 | HBA-1 | LHBA-1-1 | WWN-L1 | INQ-1 | 1 | PHBA-1 |
| 2 | VM-1 | HBA-2 | LHBA-2-1 | WWN-L2 | INQ-2 | 1 | PHBA-2 |
| 3 | VM-2 | HBA-1 | LHBA-1-2 | WWN-L3 | INQ-3 | 1 | PHBA-1 |
| 4 | VM-2 | HBA-2 | LHBA-2-2 | WWN-L4 | INQ-4 | 1 | PHBA-2 |
| | | | | | | | |

FIG. 7A

| # | LU ID | LU INQ | CHA ID | PORT WWN | ACCESS PERMITTED WWN | ACCESS TYPE |
|---|---|---|---|---|---|---|
| 1 | LU-1 | INQ-1 | C-1 | WWN-1-C1-1 | WWN-L1 | Full |
| 2 | LU-1 | INQ-1 | C-1 | WWN-1-C1-1 | WWN-1-P1-1 | Inquiry |
| 3 | LU-2 | INQ-2 | C-2 | WWN-1-C2-1 | WWN-L2 | Full |
| 4 | LU-2 | INQ-2 | C-2 | WWN-1-C2-1 | WWN-1-P2-1 | Inquiry |
| 5 | LU-3 | INQ-3 | C-1 | WWN-1-C1-1 | WWN-L3 | Full |
| 6 | LU-3 | INQ-3 | C-1 | WWN-1-C1-1 | WWN-1-P1-1 | Inquiry |
| 7 | LU-4 | INQ-4 | C-2 | WWN-1-C2-1 | WWN-L4 | Full |
| 8 | LU-4 | INQ-4 | C-2 | WWN-1-C2-1 | WWN-1-P2-1 | Inquiry |
|   |       |        |        |            |            |         |

| # | CHA ID | PORT WWN |
|---|---|---|
| 1 | C-1 | WWN-1-C1-1 |
| 2 | C-2 | WWN-1-C2-1 |
| 3 | C-3 | WWN-1-C3-1 |
| 4 | C-4 | WWN-1-C4-1 |
| 5 | C-5 | WWN-1-C5-1 |
| 6 | C-6 | WWN-1-C6-1 |
|   |     |            |

| # | AP ID | TYPE | INTERNAL HBA ID | LHBA WWN | LU INQ | INTERNAL VOL ID | DEVICE ID | LU ID |
|---|---|---|---|---|---|---|---|---|
| 1 | VM-1 | AP | HBA-1 | WWN-L1 | INQ-1 | 1 | ST-1 | LU-1 |
| 2 | VM-1 | Data | HBA-2 | WWN-L2 | INQ-2 | 1 | ST-1 | LU-2 |
| 3 | VM-2 | AP | HBA-1 | WWN-L3 | INQ-3 | 1 | ST-1 | LU-3 |
| 4 | VM-2 | Data | HBA-2 | WWN-L4 | INQ-4 | 1 | ST-1 | LU-4 |
|   |       |      |       |         |       |   |      |      |

FIG. 9A

| # | SERVER ID | HBA ID | HBA WWN | LHBA ID | LHBA WWN | ALLOCATED DESTINATION |
|---|---|---|---|---|---|---|
| 1 | SV-1 | PHBA-1 | WWN-1-P1-1 | LHBA-1-1 | WWN-L1 | VM-1 |
| 2 | SV-1 | PHBA-1 | WWN-1-P1-1 | LHBA-1-2 | WWN-L3 | VM-2 |
| 3 | SV-1 | PHBA-2 | WWN-1-P2-1 | LHBA-2-1 | WWN-L2 | VM-1 |
| 4 | SV-1 | PHBA-2 | WWN-1-P2-1 | LHBA-2-2 | WWN-L4 | VM-2 |
| 5 | SV-1 | PHBA-3 | WWN-1-P3-1 | | | |
| 6 | SV-1 | PHBA-4 | WWN-1-P4-1 | | | |
| | | | | | | |

FIG. 9B

| # | SERVER ID | HBA ID | FREQUENCY | LPCPU ID | ALLOCATED AMOUNT | ALLOCATED DESTINATION |
|---|---|---|---|---|---|---|
| 1 | SV-1 | PCPU-1 | 2.8 GHz | LPCPU-1-1 | 50 % | VM-1 |
| 2 | SV-1 | PCPU-2 | 2.4 GHz | LPCPU-2-1 | 50 % | VM-2 |
| 3 | SV-1 | PCPU-3 | 2.4 GHz | LPCPU-3-1 | 50 % | VM-2 |
| 4 | SV-1 | PCPU-4 | 2.0 GHz | | | |
| | | | | | | |

FIG. 9C

| # | SERVER ID | MEM ID | SIZE | LMEM ID | ALLOCATED AMOUNT | ALLOCATED DESTINATION |
|---|---|---|---|---|---|---|
| 1 | SV-1 | PMEM-1 | 4 GB | LMEM-1-1 | 25 % | VM-1 |
| 2 | SV-1 | PMEM-1 | 4 GB | LMEM-1-2 | 25 % | VM-2 |
| | | | | | | |

FIG. 9D

| # | SERVER ID | ADDRESS |
|---|---|---|
| 1 | SV-1 | IP-SV-1 |
| 2 | SV-2 | IP-SV-2 |
| | | |

FIG. 10A

| # | DEVICE ID | LU ID | LU INQ | CHA ID | PORT WWN | ACCESS PERMITTED WWN | ACCESS TYPE |
|---|---|---|---|---|---|---|---|
| 1 | ST-1 | LU-1 | INQ-1 | C-1 | WWN-1-C1-1 | WWN-L1 | Full |
| 2 | ST-1 | LU-1 | INQ-1 | C-1 | WWN-1-C1-1 | WWN-P1-1 | Inquiry |
| 3 | ST-1 | LU-2 | INQ-2 | C-2 | WWN-1-C2-1 | WWN-L2 | Full |
| 4 | ST-1 | LU-2 | INQ-2 | C-2 | WWN-1-C2-1 | WWN-P1-2 | Inquiry |
| 5 | ST-1 | LU-3 | INQ-3 | C-1 | WWN-1-C1-1 | WWN-L3 | Full |
| 6 | ST-1 | LU-3 | INQ-3 | C-1 | WWN-1-C1-1 | WWN-P1-1 | Inquiry |
| 7 | ST-1 | LU-4 | INQ-4 | C-2 | WWN-1-C2-1 | WWN-L4 | Full |
| 8 | ST-1 | LU-4 | INQ-4 | C-2 | WWN-1-C2-1 | WWN-P1-2 | Inquiry |
|   |      |      |       |     |            |          |         |

FIG. 10B

| # | DEVICE ID | CHA ID | PORT WWN |
|---|---|---|---|
| 1 | ST-1 | C-1 | WWN-1-C1-1 |
| 2 | ST-1 | C-2 | WWN-1-C2-1 |
| 3 | ST-1 | C-3 | WWN-1-C3-1 |
| 4 | ST-1 | C-4 | WWN-1-C4-1 |
| 5 | ST-1 | C-5 | WWN-1-C5-1 |
| 6 | ST-1 | C-6 | WWN-1-C6-1 |
|   |      |     |            |

FIG. 10C

| # | DEVICE ID | ADDRESS |
|---|---|---|
| 1 | ST-1 | IP-ST-1 |
| 2 | ST-2 | IP-ST-2 |
|   |      |         |

FIG. 11

| # | ACCESS GROUP ID | PORT WWN |
|---|---|---|
| 1 | AG-1 | WWN-1-C1-1 |
| 2 | AG-1 | WWN-1-P1-1 |
| 3 | AG-1 | WWN-L1 |
| 4 | AG-1 | WWN-L3 |
| 5 | AG-2 | WWN-1-C2-1 |
| 6 | AG-2 | WWN-1-P2-1 |
| 7 | AG-2 | WWN-L2 |
| 8 | AG-2 | WWN-L4 |
|  |  |  |

7170  7171  7172  717

COUPLING BETWEEN SERVER AND STORAGE APPARATUS USING DETECTED I/O ADAPTOR AND ALLOWING APPLICATION EXECUTION BASED ON ACCESS GROUP AND PORT CONNECTION GROUP IN VIRTUALIZED ENVIRONMENT

CROSS-REFERENCE TO PRIOR APPLICATION

This application relates to and claims the benefit of priority from Japanese Patent Application number 2009-107289, filed on Apr. 27, 2009 the entire disclosure of which is incorporated herein by reference.

BACKGROUND

The present invention generally relates to a storage management method in a computer system. More specifically, the present invention relates to a technology for managing an input/output path from a computer to a storage apparatus.

The SAN (Storage Area Network) is widely known as a technology for utilizing a storage apparatus to which a server computer is coupled by a network as a data storage area. An access between a server computer and a storage apparatus can be implemented by coupling a host bus adapter (HBA: Host Bus Adapter) included in a computer and a channel adapter included in a storage apparatus by a high speed network such as a fiber channel (FC: Fibre Channel).

A plurality of server computers and a plurality of storage apparatuses can be coupled by using a switch. In the case in which a plurality of server computers and a plurality of storage apparatuses are coupled, an access control can be carried out by using a zoning technology for limiting a combination of an HBA and a channel adapter of a computer that can be accessed or a LUN masking technology for limiting an HBA of a server computer that can access an LU (Logical Unit) that is provided by a storage apparatus. In the case of an access control, the identification information of an HBA and a WWN (World Wide Name) of a channel adapter is used.

On the other hand, a technology for implementing a plurality of virtual computers on one server computer by using a hypervisor that logically splits a computer resource that includes a CPU, a memory, a LAN adapter, and an HBA and that operates them as an independent virtual computer, and a technology for logically splitting a storage resource that includes a CPU, a disk cache, a channel adapter, and a physical disk on a storage apparatus and for operating them as an independent virtual storage apparatus are known.

Moreover, a technology is known in which an OS (Operating System) and an application program are operated continuously on a virtual computer even in the case in which a physical fault occurs in a server computer by taking over a virtual computer among a plurality of server computers by making a computer system to be redundant in such a manner that a computer resource that is required by a virtual computer can be ensured in advance. The following Patent Citation 1 discloses a technology in which a computer system is made redundant in such a manner that a computer resource that is required by a virtual computer and that includes a storage area that is provided by a storage apparatus can be ensured in advance by previously determining a physical path between a server computer and a storage apparatus that are operated by a hypervisor and a path between a virtual computer and a virtual storage.

[Patent Citation 1]
Japanese Patent Application Laid-Open Publication No. 2006-209487

SUMMARY

A current computer system is required to follow a rapid change of a business. A service in which an information technology is utilized for providing a new value is continuously provided. A value of a service is changed every day every hour from a start of a service to an end of a service. A service in which an information technology is utilized is implemented by an application program. Consequently, a change of a value of a service means a change of a value of an application program.

According to an expand of a service to be provided and a rapid increase in an amount of data, the number of computer resources and storage resources that are required is rapidly increased. On the other hand, an expense for an information technology is restricted.

Consequently, in the case in which an application program is operated in an environment corresponding to a value of a service to be provided and a value of a service is changed by a start of a new service, it is necessary to rapidly reconstruct an execution environment of an application program corresponding to the value.

By a technology that makes a computer system redundant in such a manner that a computer resource that includes a storage area that is provided by a storage apparatus coupled to a network and that is required by a virtual computer can be ensured in advance, a server computer that is an execution environment of an application program can be changed from a first server computer to a second server computer. However, regardless of a change of a value of an application program, it is necessary to make a server computer of a taking over source and a server computer of a taking over destination be corresponded to each other in advance. Consequently, in the case in which a value of an application program is changed beyond an assumption, a utilization efficiency of a computer resource is extremely reduced and a maintenance cost is increased more than necessary. A change of a value of an application program occurs in the case in which a service-in of a service in which a similar application program is utilized is front-loaded with a service-in of a competing vendor as a turning point for instance. It is extremely difficult to make an accurate prediction of a change of a value of an application program.

Consequently, it is preferable that a server computer that executes an application program can be dynamically changed corresponding to a change of a value, a necessity, and a priority order of an application program. However, in the case in which a server computer that executes an application program is tried to be dynamically changed and data that is used by an application program can be accessed, an illegal access such as an irregular obtainment of data and a break of data may occur by an impersonation of an server computer by a malicious user.

An object of the present invention is to provide a storage management method for reconstructing an execution environment of an application program corresponding to a change of a value of an application program. Another object of the present invention is to configure a system of checks in such a manner that the application program is not executed on an incorrect server computer or a server computer that is illegally coupled to a network.

The present invention was made in order to solve the above problems of the conventional art. The present invention provides a storage management system and a storage management method that have the following characteristics.

The storage management system is provided with a server computer, a storage apparatus that is coupled to a server computer, and a management computer that is coupled to a server computer and a storage apparatus. The server computer prepares a virtual computer on a server computer. The storage apparatus prepares a logical unit. The management computer configures a path of the virtual computer and the logical unit based on the correspondence relationship between the identification information of a virtual computer and the identification information of a logical unit that is allocated to a virtual computer in the case in which the virtual computer is started in the server computer.

The virtual computer that has been prepared by the server computer is migrated to a different server computer in the case in which the storage management system is provided with at least two server computers for a storage apparatus and a management computer. The management computer specifies the identification information of a port of a storage apparatus that is allocated to a logical unit from the identification information of a virtual computer that is operated in a server computer of a migration source and the identification information of a logical unit that is allocated to a virtual computer. The management computer configures a path based on the connection relationship between a port that is allocated to a logical unit and an I/O adapter of a migration destination. The virtual computer of a server computer of a migration source is then stopped, and a virtual computer is migrated to a server computer of a migration destination. A path of a server computer of a migration source and a storage apparatus is canceled.

BRIEF DESCRIPTION OF THE DRAWINGS

FIGS. 5A, 5B and 5C are views showing the resource management information of a server computer.

FIG. 6 is a view showing the application configuration information of a server computer.

FIGS. 7A and 7B are views showing the storage resource management information of a storage apparatus.

FIG. 8 is a view showing the application management information of a management computer.

9A-9D are views showing the server configuration information of a management computer.

FIGS. 10A-10C are views showing the storage configuration information of a management computer.

FIG. 11 is a view showing the access management information of a management computer.

Figure 12:
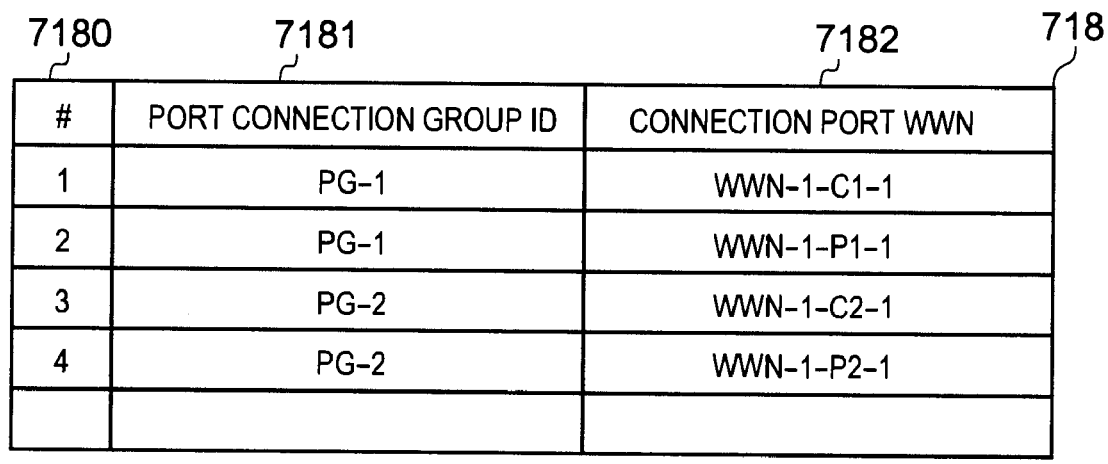

FIG. 12 is a view showing the port connection information of a management computer.

Figure 13:
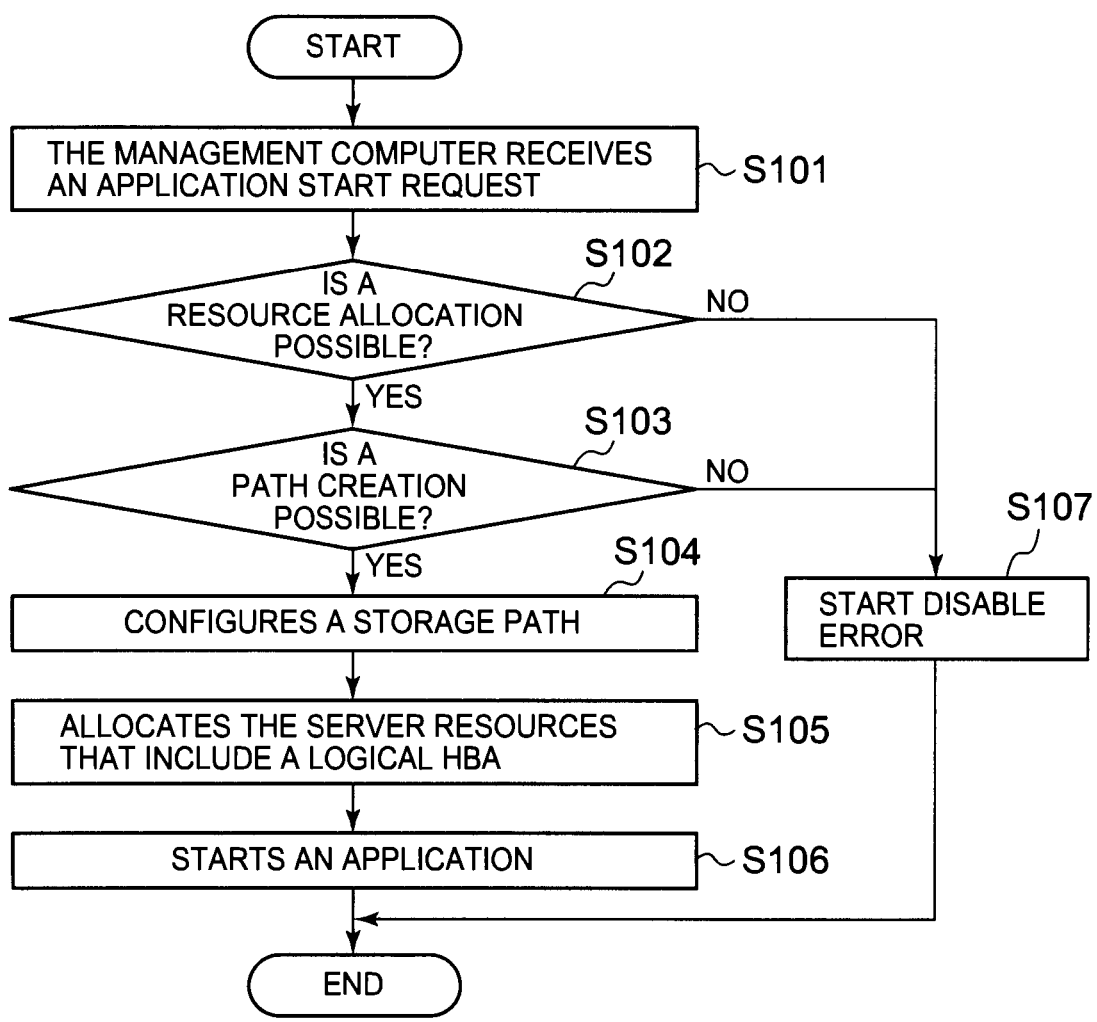

FIG. 13 is a view showing a processing flow of an application program start.

Figure 14:
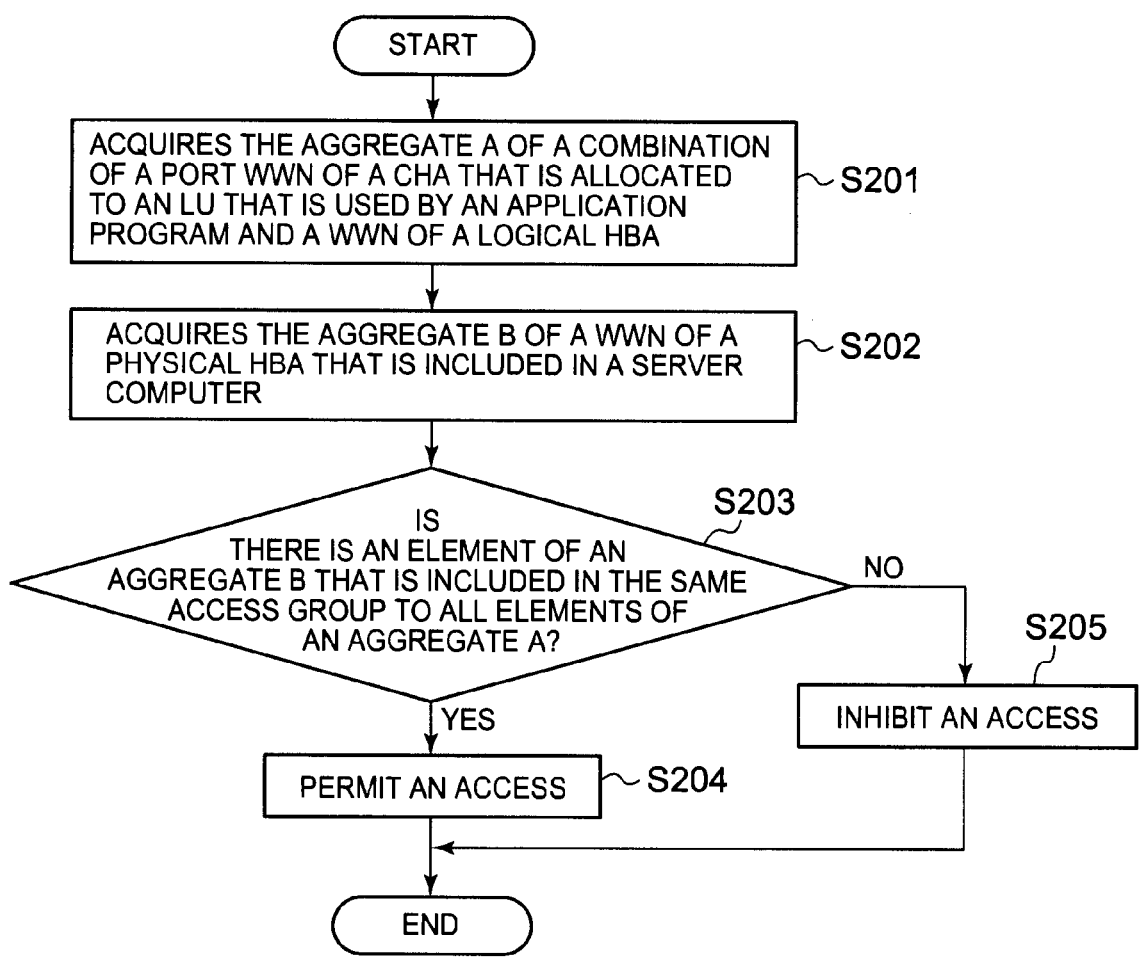

FIG. 14 is a view showing a processing flow of an access enable/disable judgment.

Figure 15:
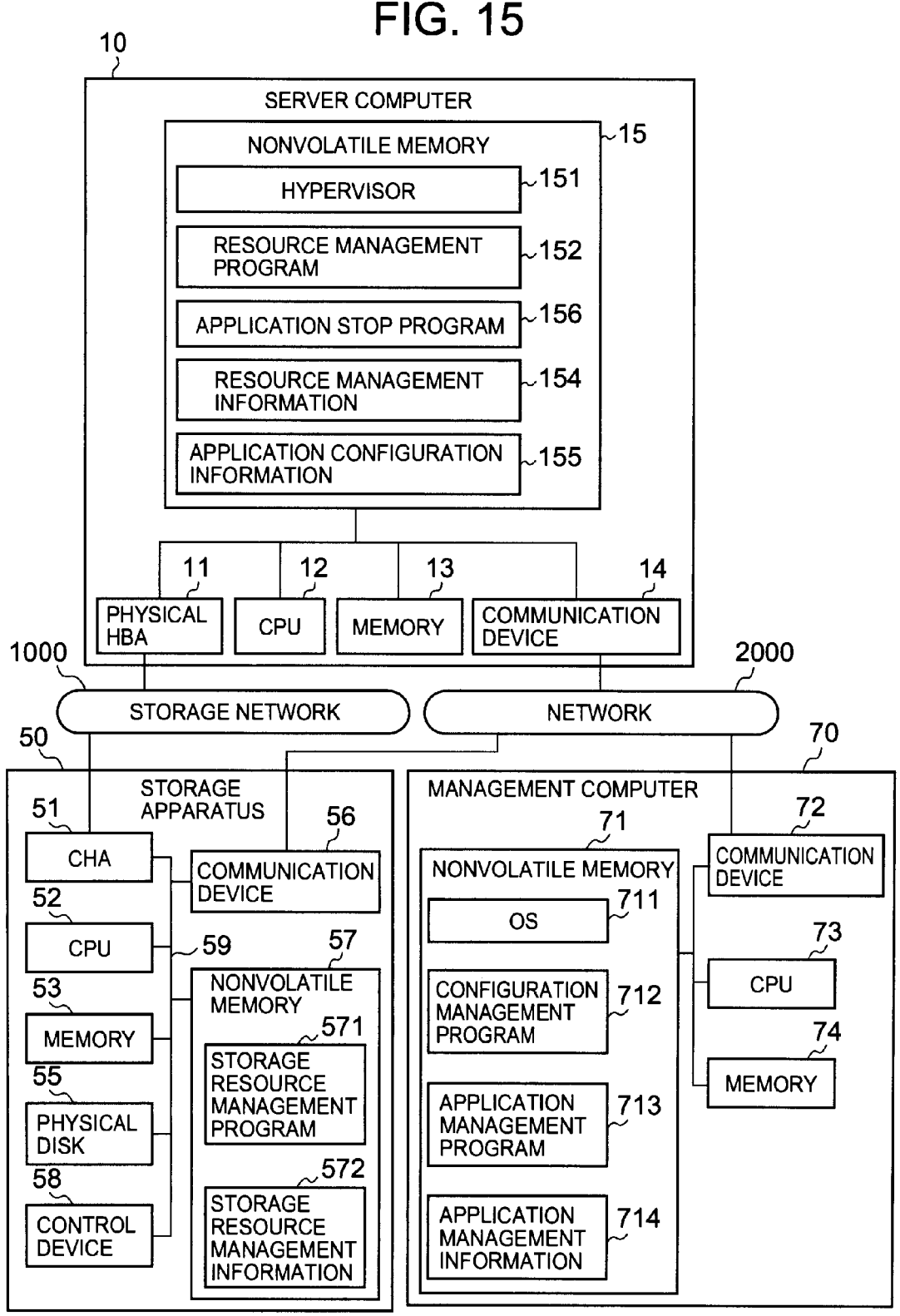

FIG. 15 is a view showing a configuration of a computer system in accordance with an embodiment 2.

Figure 16:
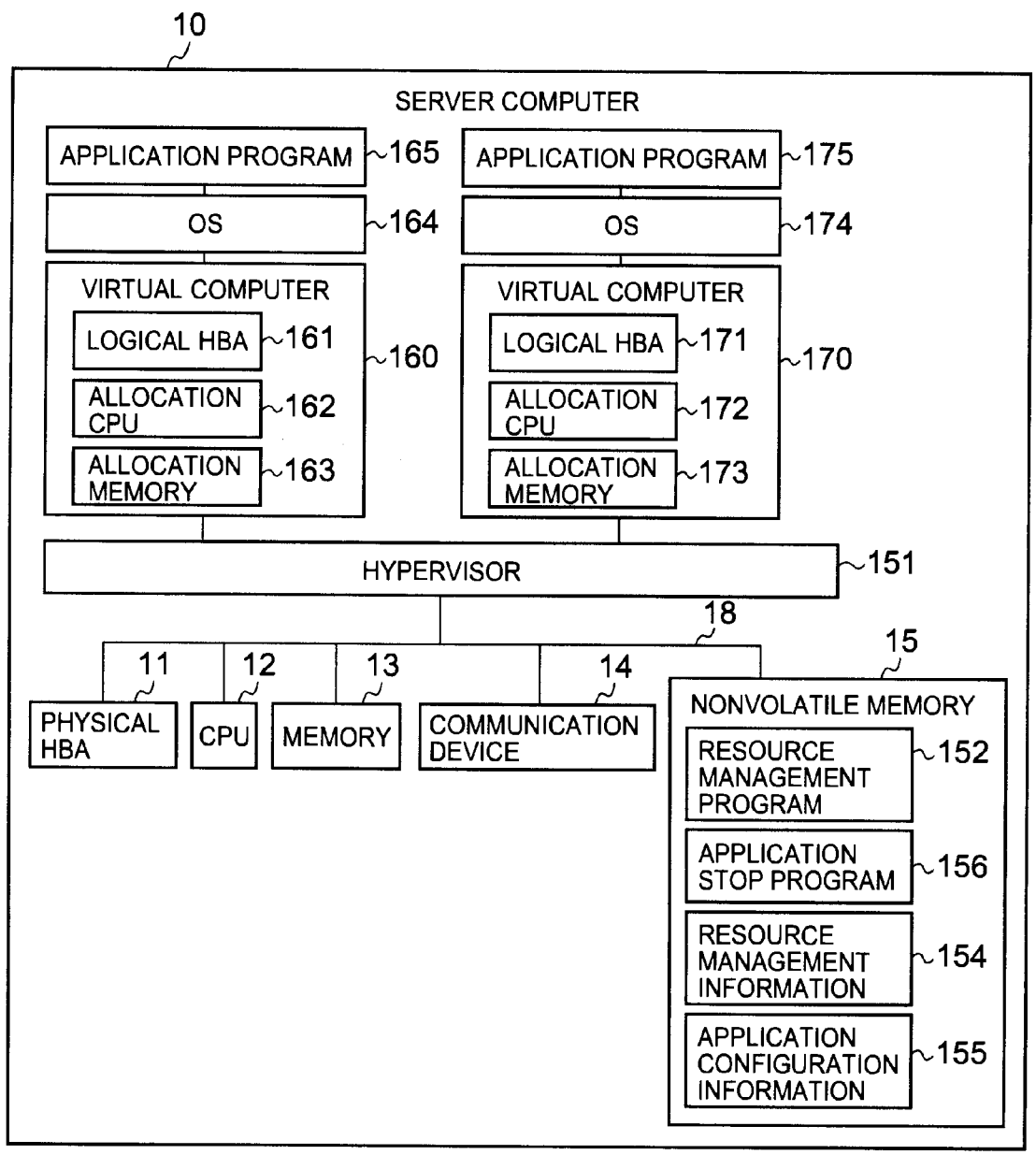

FIG. 16 is a view showing a detailed configuration of a server computer in accordance with an embodiment 2.

Figure 17:
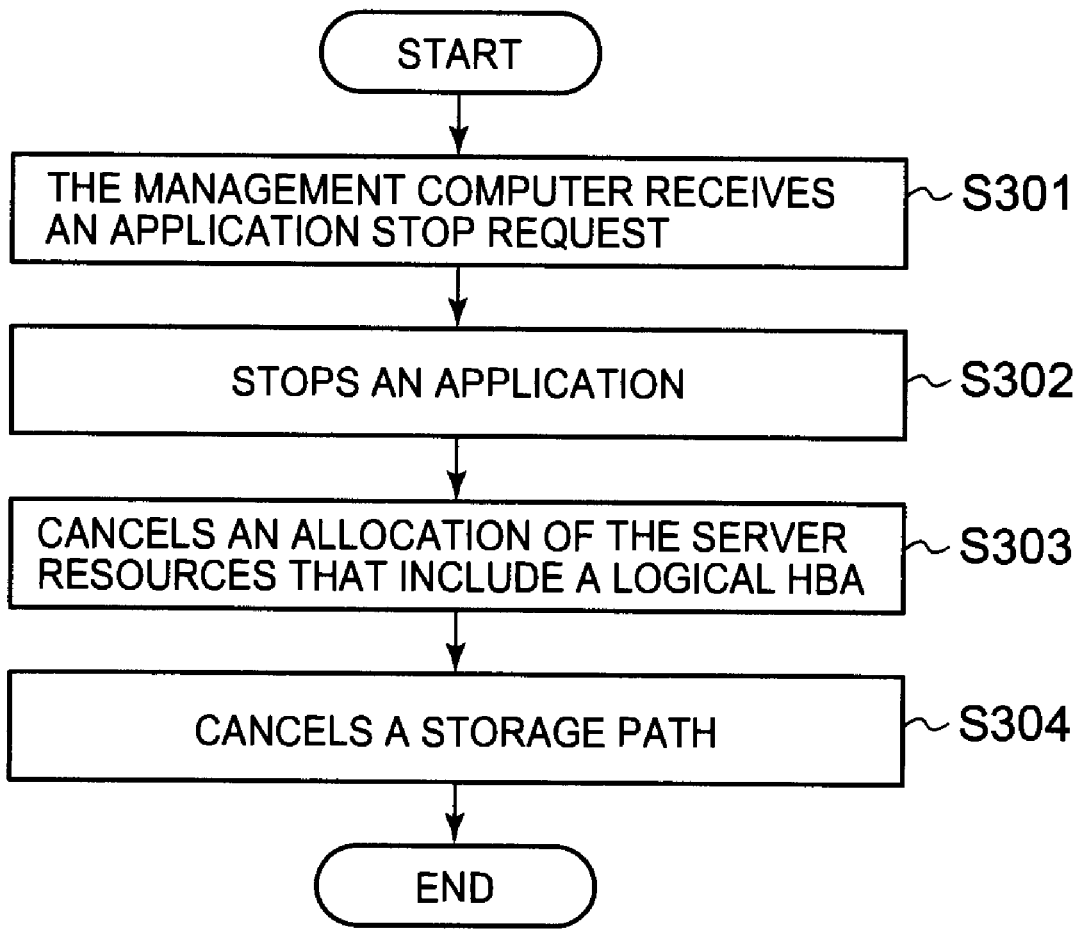

FIG. 17 is a view showing a processing flow of an application program stop.

Figure 18:
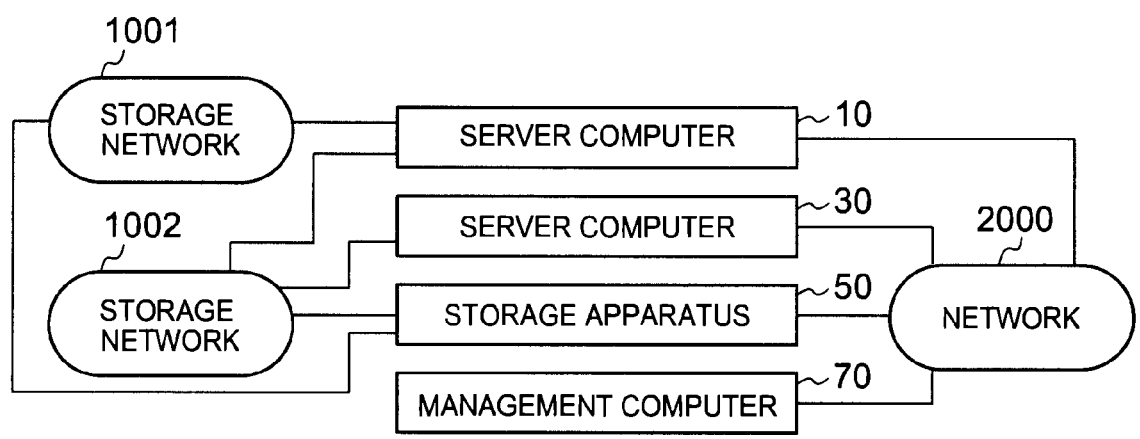

FIG. 18 is a view showing a configuration of a computer system in accordance with an embodiment 3.

Figure 19:
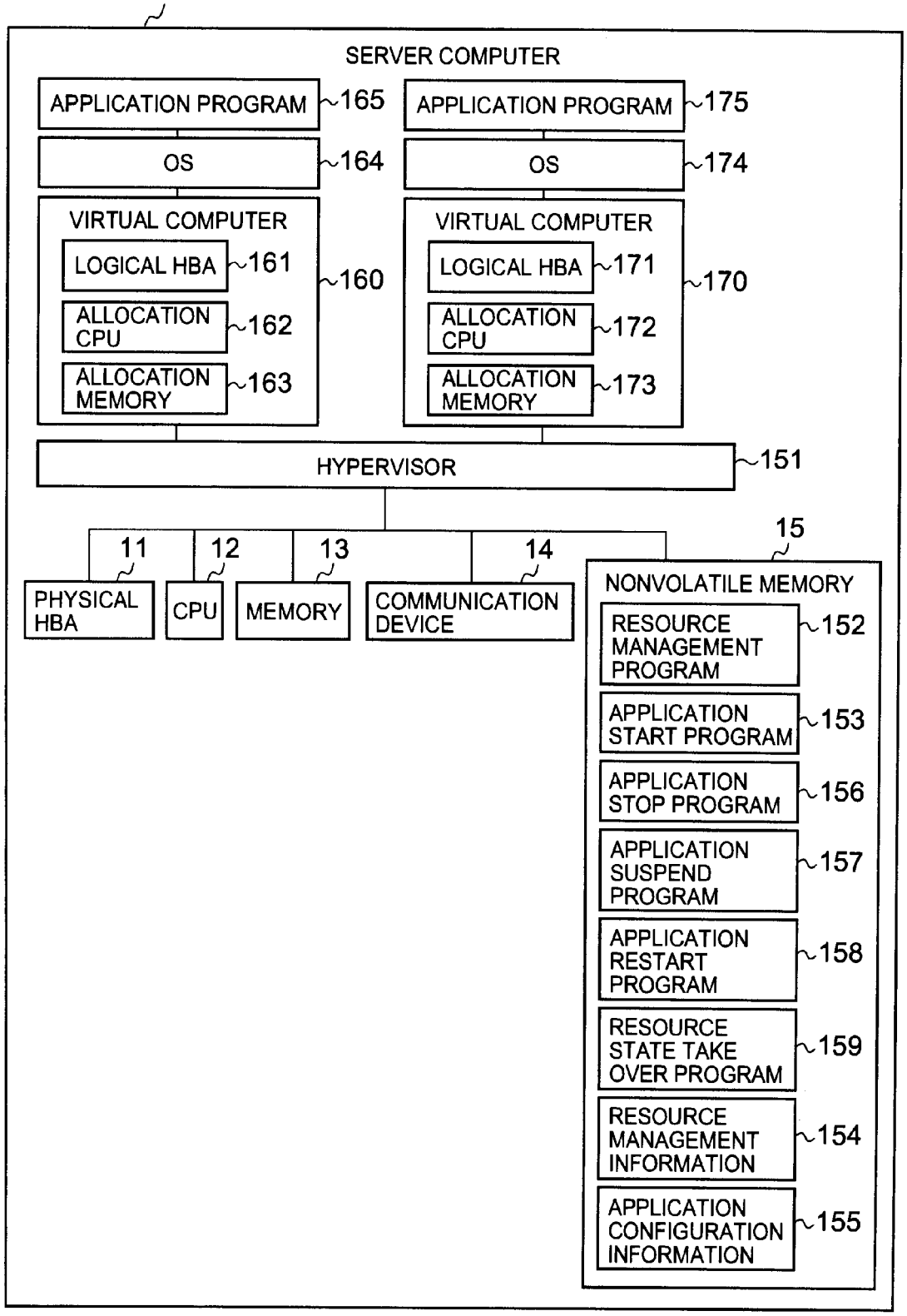

FIG. 19 is a view showing a detailed configuration of a server computer in accordance with an embodiment 3.

Figure 20:
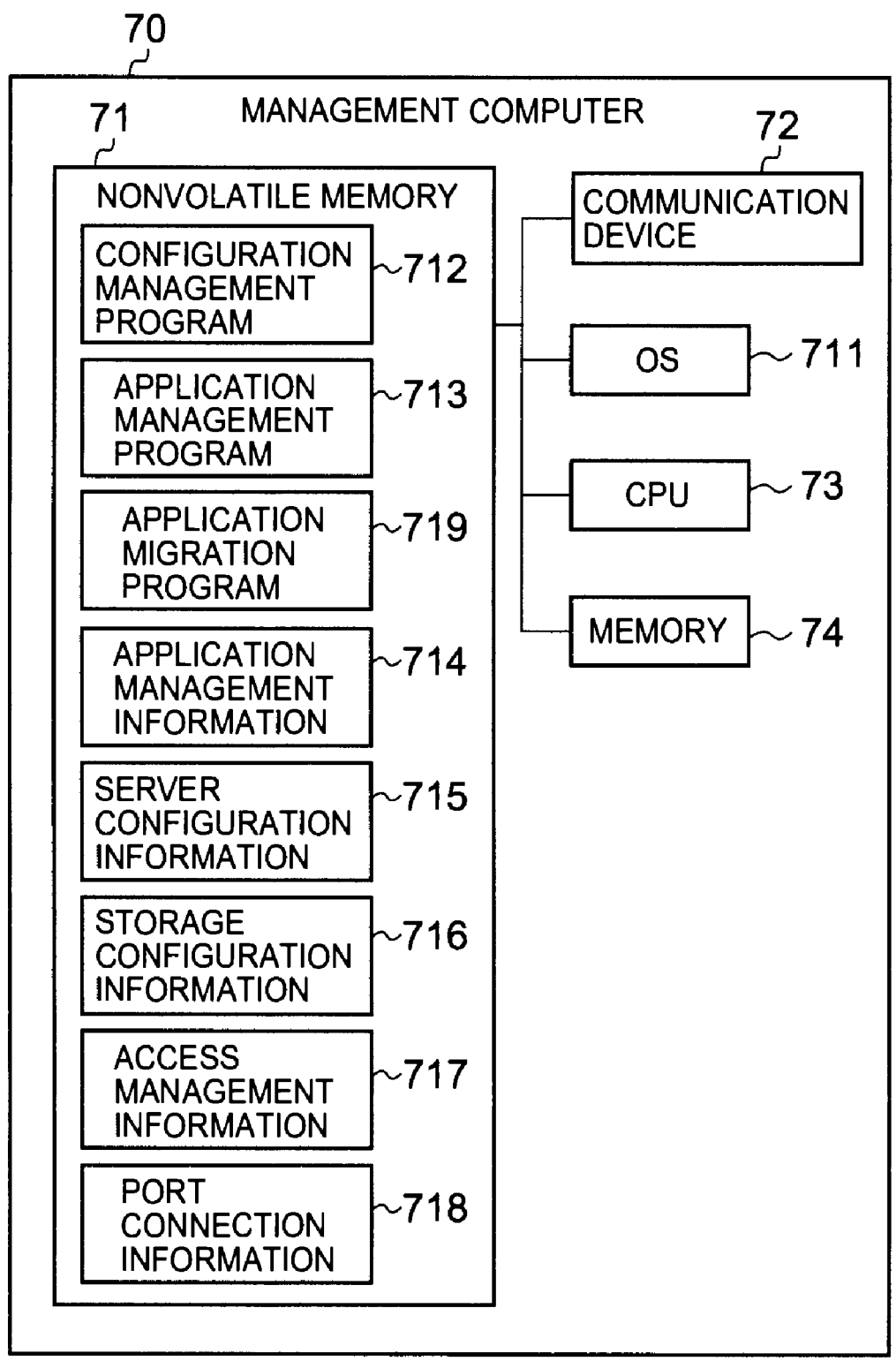

FIG. 20 is a view showing a detailed configuration of a management computer in accordance with an embodiment 3.

Figure 21:
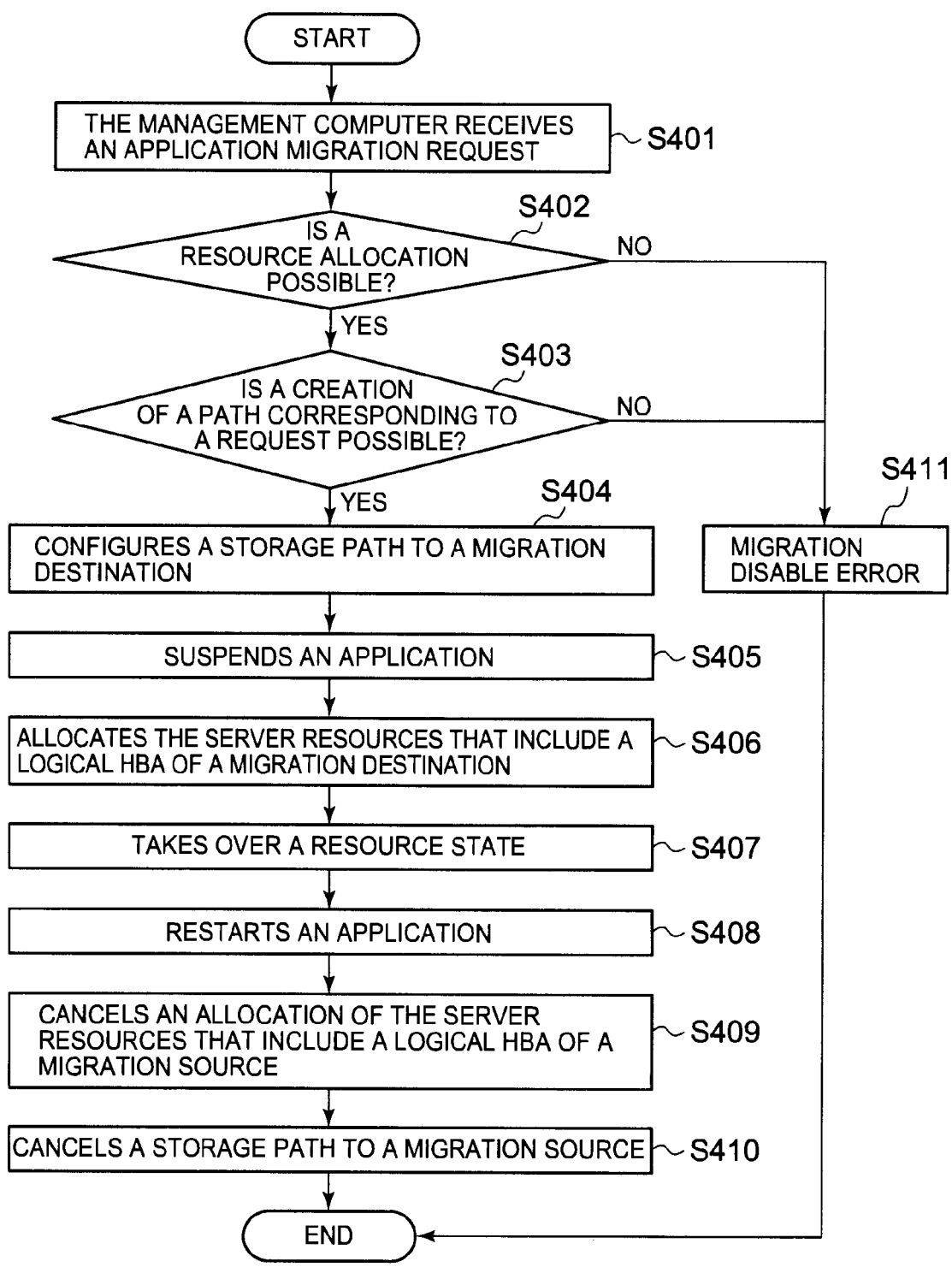

FIG. 21 is a view showing a processing flow of an application program migration.

DETAILED DESCRIPTION OF THE EMBODIMENT

A mode for the present invention will be described below in detail with reference to the drawings.
[Embodiment 1]

An embodiment 1 will describe a configuration of a path between a server and a storage apparatus in the case in which an application program is started.

Figure 1:
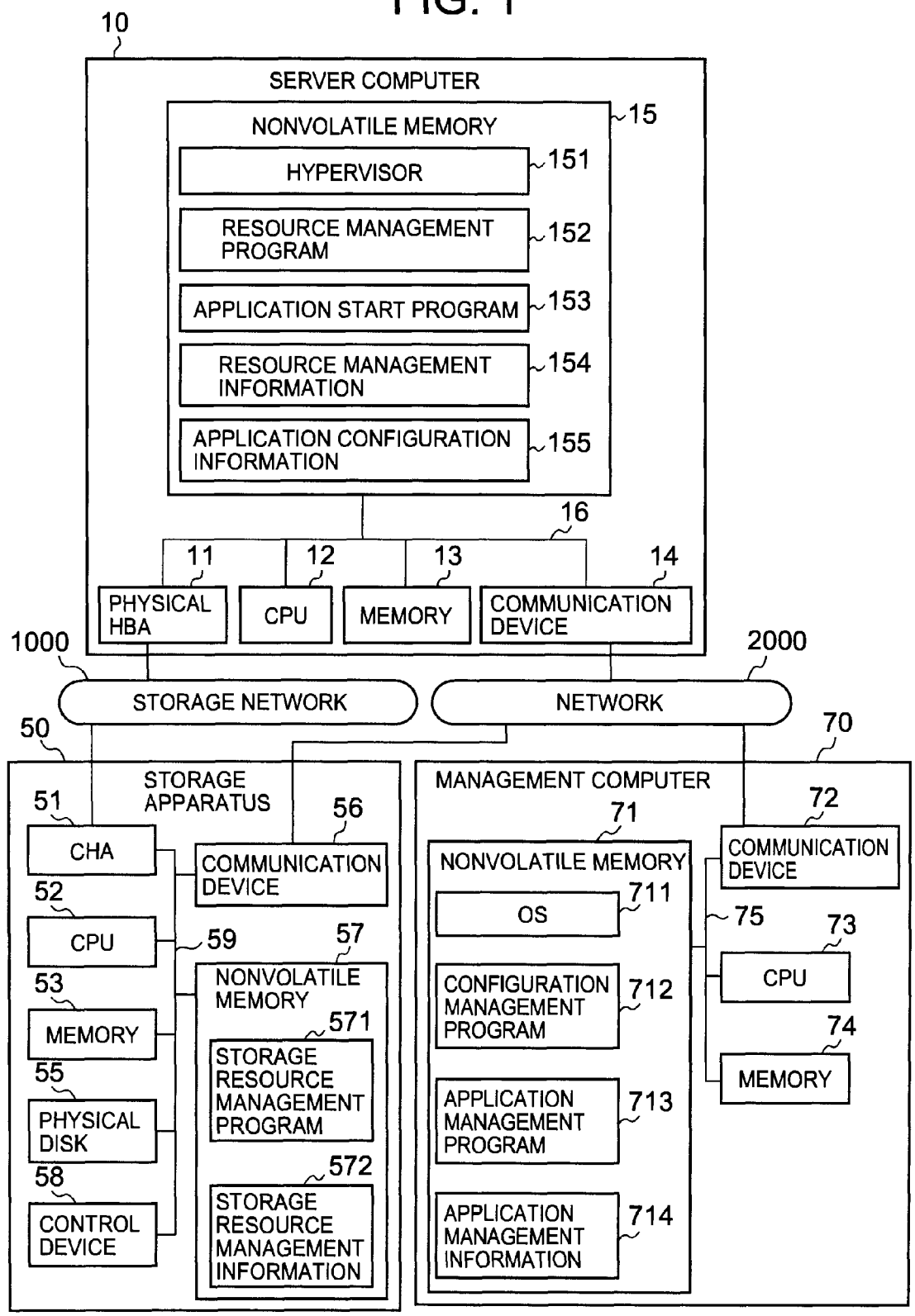
FIG. 1 is a view showing a configuration of a computer system in accordance with an embodiment 1.

FIG. 1 is a view showing a configuration of a computer system in accordance with an embodiment 1.

A computer system in accordance with an embodiment 1 is configured by a server computer 10, a storage apparatus 50, and a management computer 70. The server computer 10 and the storage apparatus 50 are coupled to each other via a storage network 1000. Moreover, a management computer 70 is coupled to the server computer 10 and the storage apparatus 50 via a network 2000.

An application program is executed by the server computer 10, and the application program that is executed by the server computer 10 and data that is used by the application program are stored into the storage apparatus 50.

The management computer 70 collects the management information of the server computer 10 and the storage apparatus 50, and configures the management information by transmitting a processing request to the server computer 10 and the storage apparatus 50 as needed.

The server computer 10 and the storage apparatus 50 receives the processing request that is transmitted from the management computer 70, and a program group for carrying out a processing corresponding to a request is executed. The program can be mounted as a service program that is called an agent and can be mounted as an independent program that can be executed from a network. Moreover, the program can be mounted to a chip on a dedicated hardware (not as software).

There can also be a plurality of server computers 10, a plurality of storage apparatuses 50, and a plurality of storage networks 1000. In this case, one server computer is coupled to at least one storage apparatus via at least one storage network. Moreover, each server computer and each storage apparatus are coupled to a management computer via the network 1000.

The server computer 10 is configured by physical resources such as a physical HBA 11, a CPU 12, a memory 13, a communication device 14, and a nonvolatile memory 15. The detailed configuration of the server computer 10 will be described later.

The storage apparatus 50 is configured by physical resources such as a CHA 51, a CPU 52, a memory 53, a physical disk 54, a communication device 56, a nonvolatile memory 57, and a control device 58. The detailed configuration of the storage apparatus 50 will be described later.

The management computer 70 is configured by physical resources such as a nonvolatile memory 71, a communication device 72, a CPU 73, and a memory 74. The detailed configuration of the management computer 70 will be described later.

The storage network 1000 is an I/O channel that is used for the server computer 10 to read or write data that is stored into the storage apparatus 50. In the present embodiment, a fiber channel is handled as a mounting example of the I/O channel. However, the present invention is not restricted to a fiber channel.

The network 2000 is used as a communication channel that is used for a collection and a configuration of the management information independently from the I/O channel. As a mounting example of a protocol of the network 2000, a TCP/IP (Transmission Control Protocol/Internet Protocol) can be mentioned. However, the present invention is not restricted to a TCP/IP.

The detailed configurations of the storage apparatus 50, the server computer 10, and the management computer 7 will be described in the following with reference to FIG. 2 to FIG. 4.

Figure 2:
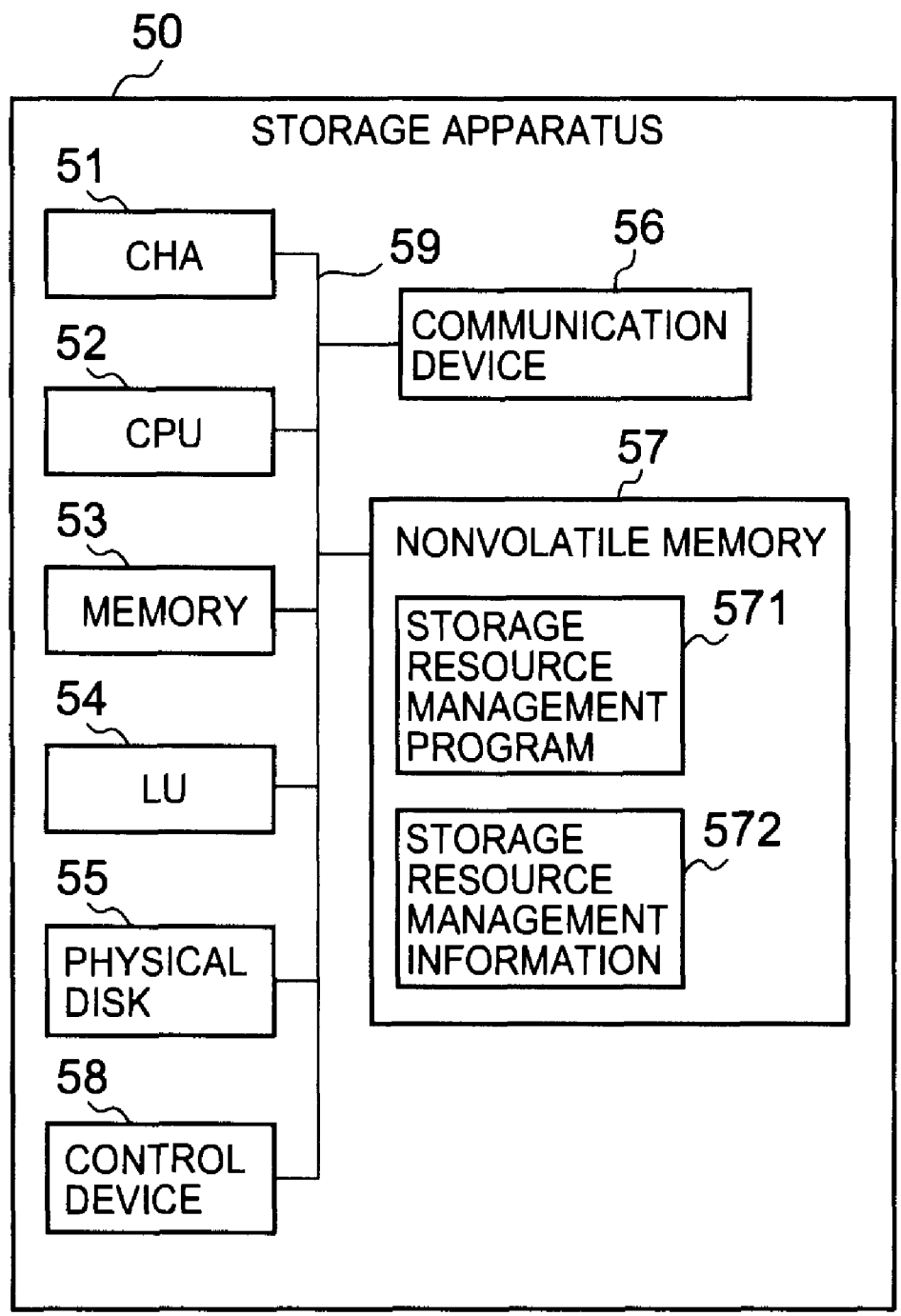
FIG. 2 is a view showing a detailed configuration of a storage apparatus in accordance with an embodiment 1.

FIG. 2 is a view showing a detailed configuration of a storage apparatus 50 in accordance with a first embodiment.

The storage apparatus 50 is configured by physical resources such as a CHA 51, a CPU 52, a memory 53, an LU 54, a physical disk 55, a communication device 56, a nonvolatile memory 57, and a control device 58. The physical resources are coupled to each other via a system bus 59.

The CHA 51 represents a channel adapter, is coupled to a storage network 1000, and carries out a processing from the server computer 10 to an I/O request. There can also be a plurality of CHAs 51.

The CPU 52 loads a program that is stored into a nonvolatile memory 57 to a memory 53, and executes an instruction that is described in a program. Hereafter, that a CPU executes an instruction that is described in a program is referred to as executing a program. There can also be a plurality of CPUs 52.

The memory 53 is used for loading a program that is stored into a nonvolatile memory 57 and for storing data that is generated in the case in which a program is executed. There can also be a plurality of memories 53.

The physical disk 54 is used for storing an application program and data. The physical disk is an HDD (Hard Disk Drive) or an SSD (Solid State Device) for instance. There can also be a plurality of physical disks 55. Moreover, a plurality of physical disk 55 can have redundancy and can be configured as a virtual disk. As an example of a configuration having redundancy, a RAID (Redundant Arrays of Inexpensive Disks) can be mentioned. However, the present invention is not restricted to a RAID.

The storage apparatus 50 provides a physical disk 55 or a virtual disk having a redundant configuration to a server computer 10 as an LU 54. The storage apparatus 50 can provide the physical disk 55 or a part of the virtual disk having a redundant configuration as an LU 54. Moreover, the storage apparatus 50 can provide a plurality of physical disks 55 or a plurality of virtual disks having a redundant configuration as an LU 54.

The nonvolatile memory 57 stores a storage resource management program 571 and the storage resource management information 572 in addition to program and data that are required for an operation of the storage apparatus 50. The nonvolatile memory is a ROM or a memory for instance. The descriptions of the program and data that are required for an operation of the storage apparatus 50 is omitted since the program and data are not directly handled in the present embodiment.

The storage resource management program 571 is a program for managing the management information of the storage resources that include a CPU, an LU, a memory, a channel adapter, and a physical disk corresponding to a request from a management computer 70. More specifically, the storage resource management program 571 provides an acquisition of the management information that is configured to each kind of a storage resource, a preparation of a redundant configuration to a physical disk, a correspondence of a physical disk and an LU, a configuration of a CHA that receives an I/O request to an LU, and a configuration of a server computer that receives an I/O request to an LU. In the case in which the storage resource management program 571 carries out a management operation corresponding to a request from a management computer 70, the storage resource management program 571 updates the content of storage resource management information 572 described later.

The storage resource management information 572 stores the management information of storage resources that include a CPU, an LU, a memory, a channel adapter, and a physical disk. An example of a part of the storage resource management information 572 will described later. There can also be a plurality of nonvolatile memories 57.

The communication device 56 is coupled to the network 2000, and carries out a communication processing to a management information acquisition request and a management information configuration request from a management computer 70. The management information acquisition request and a management information configuration request from a management computer 70 are sent to a storage resource management program 571. A communication device 56 returns a result of a processing that has been carried out by the storage resource management program 571 to the management computer 70.

In the present embodiment, the communication device 56 is used by the storage resource management program 571. However, the present invention is not restricted to the storage resource management program 571, and the communication device 56 can be used by each kind of program for handling a request from the management computer 70. There can also be a plurality of communication devices 56.

The control device 58 carries out a management of resources that include a CPU, a memory, and a communication device of the storage apparatus 50, a control of a channel adapter, and a control of a disk. There can also be a plurality of control devices 58. Moreover, a plurality of control devices 58 can be configured for carrying out different processing depending on an object to be controlled such as a control of a channel adapter and a control of a disk.

Figure 3:
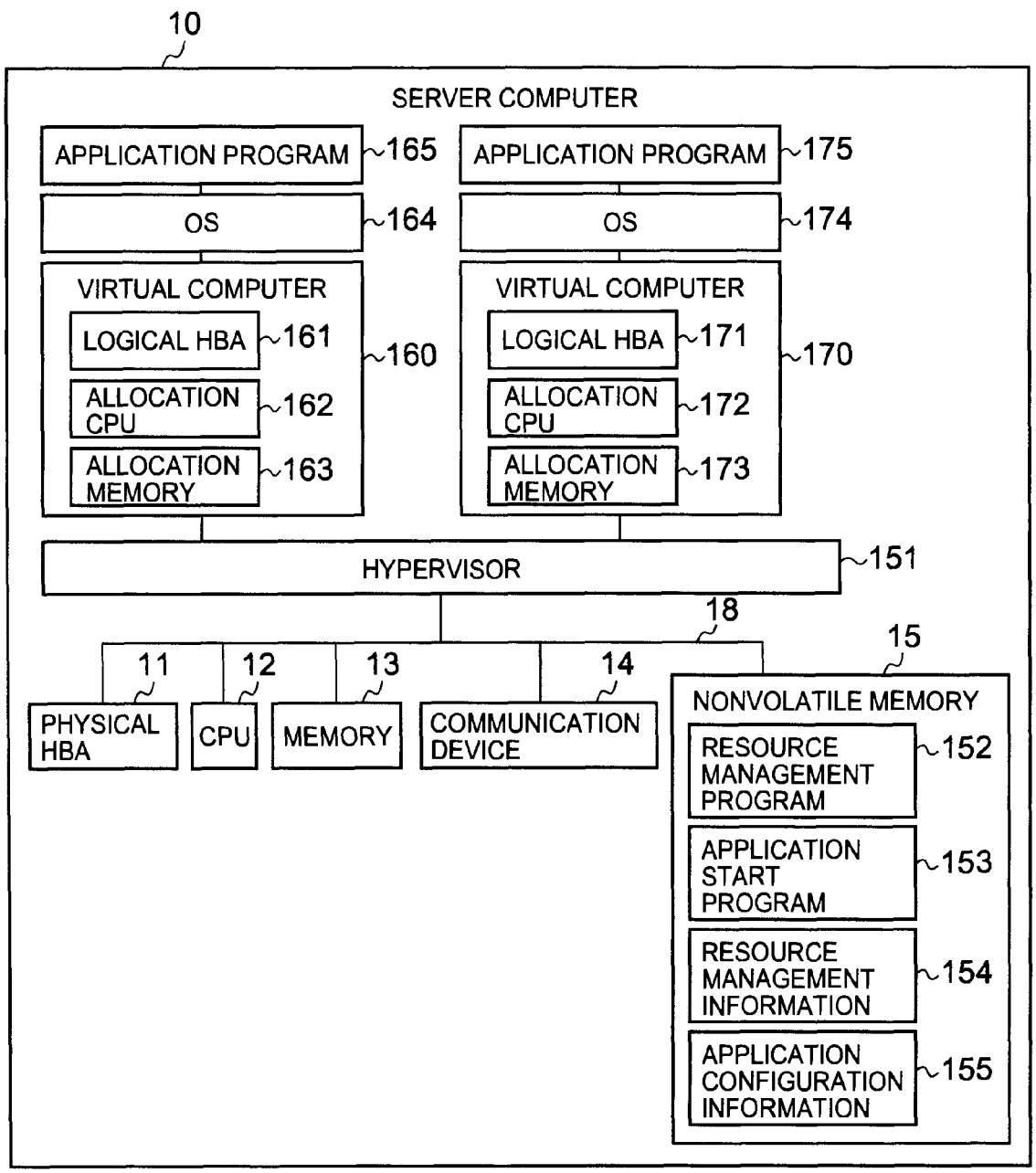
FIG. 3 is a view showing a detailed configuration of a server computer in accordance with an embodiment 1.

FIG. 3 is a view showing a detailed configuration of a server computer 10 in accordance with a first embodiment.

The server computer 10 is configured by physical resources such as a physical HBA 11, a CPU 12, a memory 13, a communication device 14, and a nonvolatile memory 15. The physical resources are coupled to each other via a system bus 16. The physical HBA 11 represents a host bus adapter that is an I/O adapter to a fiber channel, and is coupled to the storage network 1000. The application program issues an I/O request to the storage apparatus 50 for inputting or outputting required data. The physical HBA11 is virtualized and can create the logical HBAs 161 and 171 that are logical I/O adapters. There can also be a plurality of physical HBAs11.

The CPU 12 loads a program that is stored into a nonvolatile memory 15 to a memory 13, and executes an instruction that is described in a program. Similarly to the above case, that a CPU executes an instruction that is described in a program is referred to as executing a program. There can also be a plurality of CPUs 12. The memory 13 is used for loading a program that is stored into a nonvolatile memory 15 and for storing data that is generated in the case in which a program is executed. There can also be a plurality of memories 13.

The nonvolatile memory 15 stores a program and data that are required for an operation of the hypervisor 151, a resource management program 152, an application start program 153, a resource management information 154, an application configuration information 155 in addition to program and data that are required for an operation of the server computer 10. A program and data that are required for an operation of the hypervisor 151 are not shown. FIG. 3 shows a configuration after the hypervisor 151 is operated. The descriptions of the program and data that are required for an operation of the server computer 10 is omitted since the program and data are not directly handled in the present embodiment.

The resource management program 152 is a program for managing the management information of a resource of a server computer including a CPU, a memory, and a physical HBA corresponding to a request from a management computer 70. More specifically, the resource management program 152 provides a management operation such as an acquisition of the management information that is configured for each of resources, a creation of a logical HBA, and an allocation of a logical HBA via a hypervisor 151. Moreover, the resource management program 152 updates the content of the resource management information 154 described later corresponding to a request from a management computer 70 in the case in which the management operation is carried out.

The application start program 153 is a program for starting an application program via a hypervisor 151 corresponding to a request from a management computer 70.

The resource management information 154 stores the management information of a resource of a server computer that includes a CPU, a memory and a physical HBA. An example of a part of the resource management information 154 will described later. The application configuration information 155 stores an application program that is included in a server computer 10 and the configuration information that includes a relationship between a logical HBA that is utilized by an application and a physical HBA that is a preparation source of a logical HBA. An example of a part of the application configuration information 155 will described later.

There can also be a plurality of nonvolatile memories 15.

The communication device 14 is coupled to a network 2000, and carries out a communication processing to a management information acquisition request, a management information configuration request, and an application program start from a management computer 70. The management information acquisition request and the management information configuration request from a management computer 70 are sent to a resource management program 152. The communication device 14 returns a result of the processing by the resource management program 152 to a management computer 70. The application program start request from a management computer 70 is sent to an application start program 153. The communication device 14 returns a result of the processing by the application start program 153 to a management computer 70. In the present embodiment, the communication device 14 is utilized by a resource management program 152 and an application start program 153. However, the present invention is not restricted to the resource management program 152 and the application start program 153. The communication device 14 can be utilized by each program for processing a request from a management computer 70.

There can also be a plurality of communication devices 72.

The hypervisor 151 virtualizes the computer resources such as a CPU, a memory, and a physical HBA, and provides a logical resource to an application program. In the present embodiment, the application program is handled as a program for carrying out an execution control of an application program and a taking over of a resource state to a separate hypervisor.

In the present embodiment, in the case in which a configuration can be configured from the hypervisor 151 and a logical resource can be managed based on a configuration of the hypervisor 151, a virtual computer is not restricted to.

In the present embodiment, in the case in which the HBA is virtualized in particular, the hypervisor 151 is handled in such a manner that a logical HBA is provided based on the internal configuration of an application program that is operated in an upper level and a correspondence of an internal volume and an LU that are used by an application program.

Providing a logical HBA based on an internal configuration of an application program can be achieved by assigning corresponding to an internal configuration of an application program in the case in which a logical HBA that is prepared by the hypervisor 151 is allocated to a virtual computer.

The hypervisor 151 controls a correspondence of an internal volume and an LU that is used by an application program. The LU is identified by the information that uniquely identifies an LU, for instance the information such as SCSI Inquiry Page 83h that is specified by an SCSI (Small Computer System Interface). The LU can be achieved by a correspondence of a specific volume on a specific logical HBA that is specified by an internal configuration of an application program.

In the present embodiment, a correspondence of an internal HBA and a logical HBA in an application and a correspondence of a volume and an LU can be achieved by configuring an application program that is operated in the upper level or the configuration information of a virtual computer.

In the case in which the hypervisor 151 carries out a correspondence of an application internal HBA and a logical HBA in an application and a correspondence of a volume and an LU, the hypervisor 151 updates the content of the application configuration information 155.

The hypervisor 151 carries out a start, a stop, a suspend, a restart of an application program as an execution control of an application program.

The hypervisor 151 takes over a state of a logical resource of an application program that suspends an execution in a migration of an application program, and restarts the execution on another hypervisor.

Figure 4:
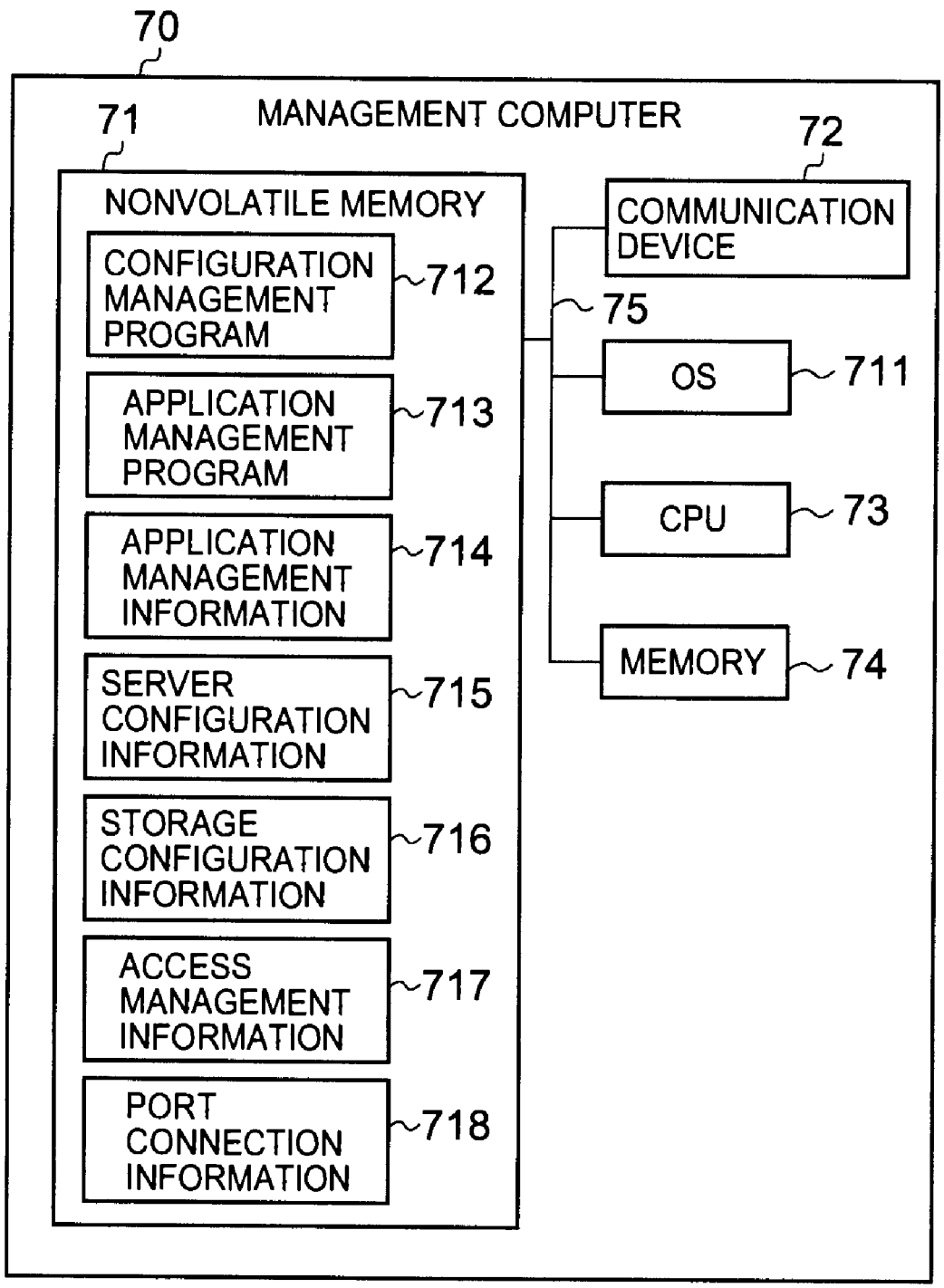
FIG. 4 is a view showing a detailed configuration of a management computer in accordance with an embodiment 1.

FIG. 4 is a view showing a detailed configuration of a management computer 70 in accordance with a first embodiment.

The management computer 70 is configured by the physical resources such as a CPU 73, a memory 74, a nonvolatile memory 71, and a communication device 72. The physical resources are coupled to each other via a system bus 74. The details of the management computer 70 will described later.

The CPU 73 loads a program that is stored into a nonvolatile memory 71 to a memory 74, and executes an instruction that is described in a program. Hereafter, that a CPU executes an instruction that is described in a program is referred to as executing a program. There can also be a plurality of CPUs 73.

The memory 74 is used for loading a program that is stored into a nonvolatile memory 71 and for storing data that is generated in the case in which a program is executed. There can also be a plurality of memories 74.

The nonvolatile memory 71 stores a program and data that are required for an operation of the OS 711, a configuration management program 712, an application management program 713, the application management information 714, the server configuration information 715, the storage configuration information 716, the access management information 717, and the port connection information 718 in addition to program and data that are required for an operation of the management computer 70. A program and data that are required for an operation of the OS 711 are not shown in the figure. FIG. 4 shows a configuration after the OS 711 is operated. The descriptions of the program and data that are required for an operation of the management computer 70 is omitted since the program and data are not directly handled in the present embodiment.

The OS 711 manages the resources that include a CPU, a memory, and a communication device of the management computer 70, and provides an interface for a resource operation to a user. The resource operation includes an execution of a program.

The configuration management program 712 provides an operation for an acquisition of the configuration information that is included in the management information of a server computer 10 and a storage apparatus 50 and an operation for a change of a configuration. In the case in which a configuration of a server computer 10 is changed, the content of the server configuration information 715 that is described later is updated. In the case in which a configuration of a storage apparatus 50 is changed, the content of the storage configuration information 716 that is described later is updated.

The application management program 713 provides an operation for a start and a stop of an application program on the server computer 10.

The application management information 714 stores the management information that includes a relationship between a configuration of an application program and a storage area that is utilized by an application program. An example of a part of the application management information 714 will described later.

The server configuration information 715 stores the management information of a resource of a server computer that includes a CPU, a memory and a physical HBA of a server computer 10. An example of a part of the server configuration information 715 will described later.

The storage configuration information 716 stores the management information of a storage resource that includes a CPU, a memory, a storage resource, and a physical disk of a storage apparatus 50. An example of a part of the storage configuration information 716 will described later.

The access management information 717 stores the information that specifies a combination of an HBA and a CHA that allow an access. An example of the access management information 717 is illustrated in FIG. 11.

The port connection information 718 stores the information related to a combination of an HBA and a CHA that is a connection relationship physically and logically on a storage network. An example of the port connection information 718 is illustrated in FIG. 12. There can also be a plurality of nonvolatile memories 15.

The communication device 72 is coupled to a network 2000, and carries out a communication processing of a management information acquisition request and a management information configuration request to a server computer 10 and a storage apparatus 50 according to a request from a configuration management program 712 and an application management program 713.

In the present embodiment, the communication device 72 is used by the configuration management program 712 and the application management program 713. However, the present invention is not restricted to the configuration management program 712 and the application management program 713, and the communication device 72 can be used by each kind of program that issues a management information acquisition request and a management information configuration request to a server computer 10 and a storage apparatus 50. There can also be a plurality of communication devices 72.

Each kind of information that is stored into a nonvolatile memory of the server computer 10, the storage apparatus 50, and the management computer 70 will be described in the following.

FIGS. 5A-5C are views showing the information that is included in the resource management information 154 of a server computer 10. This shows the current configuration as a result of a configuration change by receiving an instruction of the management computer.

FIG. 5A is a view showing the allocation information 154a of a physical HBA resource of a server computer that is included in the resource management information 154 of the server computer 10. FIG. 5A shows the correspondence relationship of the virtual computer and a physical HBA of a server computer, a logical HBA that is created on a physical HBA, and an application program to which a logical HBA is allocated.

The allocation information 154a of a physical HBA resource includes an HBA_ID 154a1, an HBA_WWN 154a2, an LHBA_ID 154a3, an LHBA_WWN 154a4, and an allocation destination 154a5.

The HBA_ID 154a1 represents the identification information of a unique physical HBA in a single server computer.

The HBA_WWN 154a2 represents a WWN (World Wide Name) that is allocated as the physical unique identification information of a physical HBA that is specified by an HBA_ID 154a1. The WWN is the unique information for all physical HBAs. The figure shows not the notation of the WWN but the notation with a symbol that represents the unique information. In other words, a consistency of a symbol noted represents a consistency of the WWN. In the following, the WWN is noted as a symbol that represents the unique information.

The LHBA_ID 154a3 represents the identification information of a logical HBA that is created on the physical HBA that is specified by the HBA_ID 154a1. The LHBA_ID 154a3 is unique on a single server computer. A blank column indicates that a logical HBA is not created on the physical HBA that is specified by the HBA_ID 154a1.

The LHBA_WWN 154a4 represents a WWN of a logical HBA that is specified by a LHBA_ID 154a3. The LHBA_WWN 154a4 is allocated in a creation of the logical HBA, or the LHBA_WWN 154a4 is allocated corresponding to a request of the management server 70 after a creation.

The allocation destination 154a5 represents the identification information of a virtual computer and an application program to which a logical HBA that is specified by an LHBA_ID 154a3 is allocated.

Each line of the allocation information 154a of the physical HBA resource is corresponded to the allocation information of one physical HBA resource. A top 154a0 represents the number of the allocation information 154a of a physical HBA resource, and is used for describing distinctly the allocation information of one physical HBA resource as first information and second information. The information can be included in an implementation of the allocation information 154a of the physical HBA resource, or may be included in an implementation of the allocation information 154a of the physical HBA resource. The above description can also be similarly applied to each of information in the following.

FIG. 5B is a view showing the allocation information 154b of a CPU resource of a server computer that is included in the resource management information 154 of the server computer 10.

The allocation information 154b of the CPU resource includes a CPU_ID 154b1, a frequency 154b2, an LCPU_ID 154b3 LCPU_ID 154b3, an allocation amount 154b4, and an allocation destination 154b5.

The CPU_ID 154b1 represents the identification information of a unique CPU in a single server computer.

The frequency 154b2 represents an operating frequency of a CPU that is specified by the CPU_ID 154b1.

The LCPU_ID 154b3 LCPU_ID 154b3 represent the identification information of a logical CPU that is created on a CPU that is specified by the CPU_ID 154b1. The LCPU_ID 154b3 LCPU_ID 154b3 is unique in a single server computer. A blank column indicates that a logical CPU is not created on a CPU that is specified by the CPU_ID 154b1.

The allocation amount 154b4 represents a rate of a CPU processing time that is allocated to a logical CPU that is specified by the LCPU_ID 154b3 LCPU_ID 154b3 in a CPU that is specified by the CPU_ID 154b1.

The allocation destination 154b5 represents the identification information of a virtual computer and an application program to which a logical CPU that is specified by the LCPU_ID 154b3 LCPU_ID 154b3 is allocated.

FIG. 5C is a view showing the allocation information 154b of a memory resource of a server computer that is included in the resource management information 154 of the server computer 10.

The allocation information 154c of a memory resource includes a MEM_ID 154c1, a size 154c2, an LMEM_ID 154c2, an allocation amount 154c4, an allocation destination 154c5.

The MEM_ID 154c1 represents the identification information of a unique memory in a single server computer.

The size 154c2 represents a size of a memory that is specified by the MEM_ID 154c1.

The LMEM_ID 154c2 represent the identification information of a logical memory that is created on a memory that is specified by the MEM_ID 154c1. The LMEM_ID 154c2 is unique in a single server computer. A blank column indicates that a logical memory is not created on a memory that is specified by the MEM_ID 154c1.

The allocation amount 154c4 represents a rate of a memory size that is allocated to a logical memory that is specified by the LMEM_ID 154c2 in a memory that is specified by the MEM_ID 154c1.

The allocation destination 154c5 represents the identification information of a virtual computer and an application program to which a logical memory that is specified by the LMEM_ID 154c2 is allocated.

FIG. 6 is a view showing the application configuration information 155 of a server computer 10.

The point in which the information (HBA_ID) of a physical HBA is indicated is different. The figure indicates the above static relation is developed in a server computer and a server computer relation is constructed.

The application configuration information 155 includes an AP_ID 1551, an internal HBA_ID 1552, an LHBA_ID 1553, an LHBA_VVWN 1554, an LU_INQ 1555, an internal VOL_ID 1556, and an HBA_ID 1557.

The AP_ID1551 is the identification information of an instance of an application program and a virtual computer.

The internal HBA_ID 1552 represents the identification information of an HBA that is allocated as an internal configuration of an application program and a virtual computer.

In other words, the application program and the virtual computer identify an HBA by the identification information that is specified by an internal HBA_ID 1553.

The LHBA_ID 1553 represents the identification information that uniquely identifies a logical HBA that is an entity of an HBA that is specified by an internal HBA_ID 1553 on a server computer 10. A hypervisor that allocates a logical HBA to an application program and a virtual computer identifies a logical HBA using a LHBA_ID 1554.

The LHBA_WWN 1554 represents the WWN of a logical HBA that is specified by an internal HBA_ID 1553, that is, an HBA that is specified by an LHBA_ID 1554.

The LU_INQ 1555 represents the identification information of an LU that is accessed from an HBA that is specified by an internal HBA_ID 1552. The LU_INQ 1555 is unique in all LUs. In the present embodiment, the information of an SCSI Inquiry Page 83h is handled as an LU_INQ 1555. However, the present invention is not restricted to this, and the information that can uniquely identify an LU can also be used.

The internal VOL_ID1556 represents the identification information of a volume that utilizes an LU that is specified by an LU_INQ 1555 as a storage area on an HBA that is specified by an internal HBA_ID 1552 as an internal configuration of an application program and a virtual computer.

The HBA_ID 1557 represents the identification information that uniquely identifies a physical HBA in which a logical HBA that is specified by an LHBA_ID 1553 is created on a server computer 10.

FIGS. 7A and 7B are views showing the information that is included in the resource management information 572 of a storage apparatus 50. FIGS. 7A and 7B indicate a configuration as a result of the receival of an instruction of a management computer.

FIG. 7A is a view showing the allocation information 572a of a storage path of a storage apparatus that is included in the resource management information 572 of the storage apparatus 50.

The allocation information 572a of a storage path includes an LU_ID 572a1, an LU-INQ 572a2, a CHA_ID 572a3, a port WWN 572a4, an access permission WWN 572a5, and an access type 572a6.

The LU_ID 572a1 represents the identification information that uniquely identifies an LU on a storage apparatus 50.

The LU_INQ 572a2 represents the information of an SCSI Inquiry Page 83h that is allocated to an LU that is specified by an LU_ID 572a1. As described above, the LU_INQ 572a2 is not restricted to the information of an SCSI Inquiry Page 83h. The LU_INQ 572a2 can be the information that can identify an LU on a computer system.

The CHA_ID 572a3 represents the identification information that uniquely identifies a channel adapter on a storage apparatus 50.

The port WWN 572a4 represents the WWN of a port that is included in a channel adapter that is specified by a CHA_ID 572a3. The LU that is specified by an LU_ID 572a1 is accessed from a server computer 10 via a port that is specified by a port WWN 572a4.

The access permission WWN 572a5 represents the WWN of an HBA that permits an access to an LU that is specified by an LU_ID 572a1. The access type 572a6 represents an access type of the HBA that is specified by an access permission WWN 572a5 to an LU that is specified by an LU_ID572a1. Full represents a permission of all accesses such as a write of data and Inquiry, and Inquiry represents a permission of only Inquiry request.

FIG. 7B is a view showing the control device information 572b of a storage apparatus that is included in the resource management information 572 of the storage apparatus 50.

The control device information 572b includes a CHA_ID 572b1 and a port WWN 572b2.

The CHA_ID 572b1 represents the identification information that uniquely identifies a channel adapter on a storage apparatus 50.

The port WWN 572b2 represents the WWN of a port that is included in a channel adapter that is specified by a CHA_ID 572a3.

FIG. 8 is a view showing the application management information 714 of a management computer 70.

The application management information 714 of the management computer stores an application program and a static configuration definition information of a virtual computer, and includes an AP_ID 7141, a type 7142, an internal HBA_ID 7142, an LHBA_WWN 7143, an LU_INQ 7144, an internal VOL_ID 7145, an storage ID 7146, and an LU_ID 7147.

The AP_ID 7141 is the identification information of an instance of an application program and a virtual computer.

The type 7142 represents a type of a storage area that is utilized by an application program and a virtual computer. The AP represents an application program and a main body of the virtual computer. The Data represents data that is utilized by an application program and a virtual computer.

The internal HBA_ID 7143 represents the identification information of an HBA that is allocated as an internal configuration of an application program and a virtual computer. In other words, an application program and a virtual computer identify an HBA by the identification information that is specified by an internal HBA_ID 7142.

The LHBA_WWN 7144 represents the WWN of a logical HBA that is an entity of an HBA that is specified by an internal HBA_ID 7142.

The LU_INQ 7145 represents the identification information of an LU that is accessed from an HBA that is specified by an internal HBA_ID 7142. In the present embodiment, as described above, the information of an SCSI Inquiry Page 83h is used as an LU_INQ 7144. However, the present invention is not restricted to this, and the information that can uniquely identify an LU can also be used.

The internal VOL_ID 7146 represents the identification information of a volume that utilizes an LU that is specified by an LU_INQ 7145 as a storage area on an HBA that is specified by an internal HBA_ID 7142 as an internal configuration of an application program and a virtual computer.

The storage ID 7146 represents the identification information of a storage apparatus 50 that provides an LU that is specified by an LU_INQ 7145. The storage ID 7147 is unique on a computer system.

The HBA_ID 1557 represents the identification information that uniquely identifies a physical HBA in which a logical HBA that is specified by an LHBA_ID 1553 is created on a server computer 10.

The LU_ID 7148 is the identification information for identifying an LU that is specified by an LU_INQ 7145 by a storage apparatus 50.

FIGS. 9A-9D are views showing the information that is included in the server configuration information 715 of a management computer 70.

The management computer directs to all server computers of a management target to indicate a configuration as a result of a configuration change. FIG. 9A is a view showing the allocation infoiniation 715a of a physical HBA resource of a server computer on a computer system that is included in the server configuration information 715 of a management computer 70.

The allocation information 715a of a physical HBA resource includes a server ID715a1, an HBA_ID 715a2, an HBA_WWN 715a3, an LHBA_ID 715a4, an LHBA_WWN 715a5, and an allocation destination 715a6.

The server ID 715a1 represents the identification information of a server computer 10. The server ID 715a1 is unique on a computer system.

The HBA_ID 715a2 represents the identification information of a unique physical HBA in a server computer that is specified by a server ID 715a1.

The HBA_WWN 715a3 represents the WWN that is allocated to a physical HBA that is specified by an HBA_ID 715a2.

The LHBA_ID 715a4 represents the identification information of a logical HBA that is created on a physical HBA that is specified by an HBA_ID 715a2. The LHBA_ID 715a4 is unique on a server computer that is specified by a server ID 715a1. The blank column indicates that a logical HBA is not created on a physical HBA that is specified by an HBA_ID 715a2.

The LHBA_WWN 715a5 represents the WWN of a physical HBA that is specified by an LHBA_ID 715a4.

The allocation destination 715a6 represents the identification information of a virtual computer and an application program to which a logical HBA that is specified by an LHBA_ID 715a4 is allocated.

FIG. 9B is a view showing the allocation information 715b of a CPU resource of a server computer on a computer system that is included in the server configuration information 715 of the management computer 70.

The allocation information 715b of a CPU resource includes a server ID 715b1, a CPU_ID 715b2, a frequency 715b3, an LCPU_ID 715b4, an allocation amount 715b5, and an allocation destination 715b6.

The server ID 715b1 represents the identification information of a server computer 10. The server ID 715b1 is unique on a computer system.

The CPU_ID 715b2 represents the identification information of a unique CPU in a server computer that is specified by a server ID 715b1.

The frequency 715b3 represents the operating frequency of a CPU that is specified by a CPU_ID 715b2.

The LCPU_ID 715b4 represents the identification information of a logical CPU that is created on a CPU that is specified by a CPU_ID 715b2. The LCPU_ID 715b4 is unique in a server computer that is specified by a server ID 715b1. A blank column indicates that a logical CPU is not created on a CPU that is specified by a CPU_ID 715b2.

The allocation amount 715b5 represents a rate of a CPU processing time that is allocated to a logical CPU that is specified by the LCPU_ID 715b4 in a CPU that is specified by the CPU_ID 715b2.

The allocation destination 715b6 represents the identification information of a virtual computer and an application program to which a logical CPU that is specified by the LCPU_ID 715b4 is allocated.

FIG. 9C is a view showing the allocation information 715c of a memory resource of a server computer on a computer system that is included in the resource management information 715 of the management computer 70.

The allocation information 715c of a memory resource includes a server ID715c1, a MEM_ID 715c2, a size 715c3, an LMEM_ID 715c4, an allocation amount 715c5, and an allocation destination 715c6.

The server ID 715c1 represents the identification information of a server computer 10. The server ID 715c1 is unique on a computer system.

The MEM_ID 715c2 represents the identification information of a unique memory in a server computer that is specified by a server ID 715c1.

The size 715c3 represents the size of a memory that is specified by a MEM_ID 715c2.

The LMEM_ID 715c4 represent the identification information of a logical memory that is created on a memory that is specified by the MEM_ID 715c2. The LMEM_ID 715c4 is unique in a server computer that is specified by a server ID 715b1. A blank column indicates that a logical memory is not created on a memory that is specified by the MEM_ID 715c2.

The allocation amount 715c5 represents a rate of a memory size that is allocated to a logical memory that is specified by the LMEM_ID 715c4 in a memory that is specified by the MEM_ID 715c2.

The allocation destination 715c6 represents the identification information of a virtual computer and an application program to which a logical memory that is specified by the LMEM_ID 715c4 is allocated.

FIG. 9D is a view showing the address information 715d of a server computer on a computer system that is included in the server configuration information 715 of a management computer 70.

The address information 715d of a server computer includes a server ID 715d1 and an address 715d2.

The server ID 715d1 represent the identification information of a server computer 10.

The address 715d2 represent the address information of a server computer 10 that is specified by the server ID 715d1. The management computer 70 issues a management request to the server computer 10 that is specified by the server ID 715d1 by using an address that is specified by the address 715d2. An example of the address information is an IP address.

FIGS. 10A-10C are views showing the storage configuration information of a management computer 70.

The management computer directs to all server computers of a management target to indicate a configuration as a result of a configuration change.

FIG. 10A is a view showing the allocation information 716a of a storage path of a storage apparatus on a computer system that is included in the storage configuration information 716 of a management computer.

The allocation information 716a of a storage path includes a storage ID 716a1, an LU_ID 716a2, an LU_INQ 716a3, a CHA_ID 716a4, a port WWN 716a5, an access permission WWN 16a6, and an access type 716a7.

The storage ID 716a1 represents the identification information of a storage apparatus 50. The storage ID 716a1 is unique on a computer system.

The LU_ID 716a2 represents the identification information of a unique LU by a storage apparatus that is specified by the storage ID 716a1.

The LU_INQ 716a3 represents the information of an SCSI Inquiry Page 83h that is allocated to an LU that is specified by the LU_ID 716a2.

The CHA_ID 716a4 represents the identification information of a unique channel adapter by a storage apparatus that is specified by the storage ID 716a1.

The port WWN716a5 represents the WWN of a port that is included in a channel adapter that is specified by the CHA_ID 716a4. An LU that is specified by the LU_ID 716a2 is accessed from the server computer 10 via a port that is specified by the port WWN 716a5.

The access permission WWN 716a6 represents the WWN of an HBA that permits an access to an LU that is specified by the LU_ID 716a2.

The access type 716a7 represents the access type of an HBA that is specified by the access permission WWN 716a6 to an LU that is specified by the LU_ID 716a2. The Full indicates that all accesses such as a data write and Inquiry are permitted, and Inquiry represents the only Inquiry request is permitted.

FIG. 10B is a view showing the allocation information 716b of a storage path of a storage apparatus on a computer system that is included in the storage configuration information 716 of a management computer 70.

The control device information 716b includes a storage ID 716b1, a CHA_ID 716b2, and a port WWN 716b3.

The storage ID 716b1 represents the identification information of a storage apparatus 50. The storage ID 716b1 is unique on a computer system.

The CHA_ID 716b2 represents the identification information of a unique channel adapter by a storage apparatus that is specified by the storage ID 716b1.

The port WWN716b3 represents the WWN of a port that is included in a channel adapter that is specified by the CHA_ID 716b2.

FIG. 10C is a view showing the address information 716c of a storage path of a storage apparatus on a computer system that is included in the storage configuration information 716 of a management computer.

The address information 716c of a storage apparatus includes a storage ID 716c1 and an address 716c2.

The storage ID 716c1 represents the identification information of a storage apparatus 50.

The management computer 70 issues a management request to the storage apparatus 50 that is specified by the storage ID 716c1 by using an address that is specified by the address 715c2. An example of the address information is an IP address.

FIG. 11 is a view showing the access management information 717 of a management computer 70.

This indicates a combination of a logical HBA, a physical HBA, and a storage port in which the management computer permits a connection.

The access management information 717 includes an access group ID7171 and a port WWN 7172.

The access group ID7171 represents the identification information of an access group that is defined as a group in which an access is permitted in a CHA, a physical HBA, or a logical HBA.

The port WWN 7172 represents the WWN of a CHA, a physical HBA, or a logical HBA that is included in an access group that is specified by the access group ID 7171. An access is permitted in a CHA, a physical HBA, or a logical HBA to which a port WWN 7172 that is included in an access group that is specified by the same access group ID 7171.

FIG. 12 is a view showing the port connection information 718 of a management computer 70.

This indicates a physical connection of a physical HBA of a server and a storage port that is included in the same port connection group.

The port connection information 718 includes a port connection group ID7181 and a connection port WWN7182.

The port connection group ID 7181 represents the identification information of a port connection group that is defined as a group that has a physical and logical connection relationship between a CHA and a physical HBA, or a logical HBA.

The connection port WWN7182 represents the WWN of a CHA or a physical HBA that is included in the port connection group that is specified by the port connection group ID 7181. There is a physical connection relationship between a CHA or a physical HBA to which a connection port WWN7182 that is included in the port connection group that is specified by the same port connection group ID is allocated.

FIG. 13 is a view showing a processing flow of a path configuration in an application program start.

A symbol S represents a step.

Each step will be described in the following.

(Step 101)

The management computer 70 receives a start request of an application program from a manager. The start request includes the information that can specify an AP_ID that is the identification information of an application program to be started and a server ID 715a1 that is the identification information of a server computer that starts an application. The AP_ID7141 is the information that is included in the application management information 714 shown in FIG. 8. The server ID 715a 1 is the information that can specify a server ID that is included in FIG. 9. Moreover, the start request includes the information of a CPU frequency and a memory size of a server computer that is required for starting an application program.

The start request of an application program can be issued by directly executing a program provided with a GUI (Graphical User Interface) and a program provided with a CLI (Command Line Interface) by a manager. Moreover, the start request of an application program can be issued by executing a planned job in advance by a manager. The information of the required CPU frequency and memory size is included in a start request. However, the start request can also store an application program that is specified by the AP_ID of the application management information 714 or the information of a CPU processing time and a memory size that are required for an operation of an instance of a virtual computer.

(Step 102)

It is judged whether or not a resource of a server can be allocated to start an application. It is judged with reference to the CPU resource allocation information 715b that is included in the server configuration information 715 and the allocation information 715c of a memory resource whether or not the specified CPU frequency and memory size can be allocated from a server computer that is specified by a server ID. More specifically, in the case in which a frequency for every CPU is calculated by subtracting a frequency that has been allocated from a frequency of a CPU that is specified by a CPU_ID 715b2 of the CPU resource allocation information 715b and there is a frequency larger than the specified CPU frequency, it is judged that a CPU frequency can be allocated. Moreover, in the case in which a size for every memory is calculated by subtracting a size that has been allocated from a size of a memory that is specified by a MEB_ID715c2 of the allocation information 715c of a memory resource and there is a size larger than the specified memory size, it is judged that a memory size can be allocated. In the case in which a CPU frequency and a memory size can be allocated, go to (step 103). In the case in which a CPU frequency and a memory size cannot be allocated, transit to (step 107).

(Step 103)

It is judged whether or not a path to a storage area into which an instance of an application program or a virtual computer is stored can be created from the information of a server ID and an AP_ID that are included in a start request. Moreover, it is judged whether or not a path to a storage area into which data that is used by an instance of an application program that is specified by an AP_ID or a virtual computer is stored can be created.

The step of a judgment of whether or not a path can be created is divided into the following (1) to (5) in details.

(1) Acquires the information of a combination of an LU that is used by an application program and a storage apparatus that includes the used LU from the identification information of an application program. More specifically, acquires a combination of a storage ID of a line that includes an AP_ID and an LU_ID from the application management information 714 of a management computer 70. In the example of FIG. 8, in the case in which an AP_ID is a VM-1, a first line and a second line are corresponded, and a combination of a storage ID and an LU_ID is (ST-1, LU-1) and (ST-1, LU-2), respectively.

(2) Specifies a WWN of a channel adapter of a storage apparatus that can be used from the identification information of an acquired LU and a storage apparatus. More specifically, gets a port WWN of a line that includes a combination of the storage ID and the LU_ID from the storage configuration information 716a of a management computer 70. In the example of FIG. 10(a), in the case in which a combination of the storage ID and the LU_ID are (ST-1, LU-1) and (ST-1, LU-2), a corresponding port WWN is WWN-1-C1-1 and WN-1-C2-1, respectively.

(3) Acquires a WWN of a physical HBA of a used server from the identification information of a server that starts an application. More specifically, enumerates HBA_WWN of the server ID from the server configuration information 715a of a management computer 70. In the example of FIG. 9(a), in the case in which a server ID is a SV-1, corresponding HBA_WWN is WWN-1-P1-1, WWN-1-P2-1, WWN-1-P3-1, and WWN-1-P4-1.

(4) Retrieves whether or not there is a physical connection relationship between an HBA of a server and a port of a storage. More specifically, refers to the port connection information 718 that is included in a management computer 70. Then retrieves WWN of an HBA that is specified by a port WWN that has been detected in (2) and an HBA that has a physical connection relationship from HBA_WWN that has been detected in (3). In the example of FIG. 12, in the case in which the detected HBA_WWN is WWN-1-P1-1, WWN-1-P2-1, WWN-1-P3-1, and WWN-1-P4-1 and the detected port WWN is WWN-1-C1-1, there is a combination of WWN-1-P1-1 and WWN-1-C1-1PG-1 in a port connection group that is specified. Consequently, HBA of a server that is specified by WWN-1-P1-1 and WWN-1-C1-1 and a storage port are physically coupled to each other.

(5) Retrieves a physical HBA to which an HBA_WWN that exists in a port connection group from a server configuration information 715a of a management computer 70. In the example of FIG. 9(a), it is found that the WWN-1-P1-1 is a WWN of a physical HBA in which an HBA_ID is specified by a PHBA-1.

In the case in which a physical HBA is detected as described above, a path can be created.

In the case in which a path can be created, go to (Step 104). In the case in which a path cannot be created, transit to (Step 107).

(Step 104)

Configures a storage path in such a manner that the application management information 714 of a management computer 70 is complied with in paths that can be created. The configuration of a storage path is carried out by instructing a storage resource management program 571 of a storage apparatus 50 for a configuration management program 712 of a management computer 70. In the above example, the HBA_ID of a server computer 10 configures a storage path to (ST-1, LU-1) and (ST-1, LU-2) against a physical HBA that is specified by a PHBA-1.
(Step 105)

Allocates the server resources that include a logical HBA in such a manner that the application management information 714 of a management computer 70 is complied with in paths that can be created. The allocation of a server resource is carried out by instructing a resource management program 152 of a server computer 10 for a configuration management program 712 of a management computer 70. In the above example, the HBA_ID of a server computer 10 configures a logical HBA in which a WWN is WWN-1 and WWN-2 on a physical HBA that is specified by a PHBA-1. The logical HBA in which a WWN is WWN-1 is configured in such a manner that an internal HBA_ID of an application program is a HBA-1 and an LU that is used by a volume in which an internal VOL_ID is 1 is an LU that has an INQ-1 as the identification information. Moreover, the logical HBA in which a WWN is WWN-2 is configured in such a manner that an internal HBA_ID of an application program is a HBA-2 and an LU that is used by a volume in which an internal VOL_ID is 1 is an LU that has an INQ-2 as the identification information. In the case in which there is a plurality of HBA_IDs that have been detected, a path can be concentrated to one physical HBA in physical HBAs that are specified by an HBA_ID, and a path can be dispersed in such a manner that a load is dispersed by carrying out a simulation or the like.
(Step 106)

An application program is started to complete a processing. The start of an application program is carried out by instructing an application start program 153 of a server computer 10 by an application management program 713 of a management computer 70.
(Step 107)

Returns a start impossible error to an issuing resource of a request to complete a processing.

By the above steps, a start processing of an application program is completed.

In the case in which an application program is started, the enable/disable of an access from a server computer 10 to which a management computer 70 is specified to a storage area is judged. Only in the case in which it is judged that an access is possible, a start processing of an application program can be carried out.

FIG. 14 is a view showing a processing flow of an access enable/disable judgment of a management computer 70.

Each step will be described in the following.
(Step 201)

Acquires the aggregate A of a combination of a port WWN of a port that is allocated to an LU that is used by an application program and a WWN of a logical HBA. In the example of the application management information shown in FIG. 8, in the case in which an AP_ID starts an application program of a VM-1, an aggregate of a combination of an LU_INQ of an LU that is used by an application program and a WWN of a logical HBA is (INQ-1, WWN-L1) and (INQ-2, WWN-L2). From the allocation information of a storage path shown in FIG. 10(a), a port WWN of a CHA that has been allocated to an LU in which an LU_INQ is an INQ-1 is a WWN-1-C1-1, and a port WWN of a CHA that has been allocated to an LU in which an LU_INQ is an INQ-2 is a WWN-1-C2-1. An element of the aggregate A is (WWN-1-C1-1, WWN-L1) and (WWN-1-C2-1, WWN-L2).
(Step 202)

Acquires the aggregate B of a WWN of a physical HBA that is included in a server computer.

In the example of the allocation information of a physical HBA resource shown in FIG. 9(a), in the case in which a start is carried out on a server computer in which a server ID is a SV-1, an element of an aggregate B is WWN-1-P1-1, WWN-1-P2-1, WWN-1-P3-1, and WWN-1-P4-1.
(Step 203)

In the case in which there is an element of an aggregate B that is included in the same access group to all elements of an aggregate A, go to (step 204) and permit an access. In the case in which there is not an element of an aggregate B that is included in the same access group to all elements of an aggregate A, go to (step 205) and inhibit an access.

In the case in which an element of an aggregate A is (WWN-1-C1-1, WWN-L1) and (WWN-1-C2-1, WWN-L2) and an element of an aggregate B is WWN-1-P1-1, WWN-1-P2-1, WWN-1-P3-1, and WWN-1-P4-1, a judgment processing of two elements of an aggregate A is carried out.

In the example of the access management information shown in FIG. 11, the element (WWN-1-C1-1, WWN-L1) is included in an access group in which an access group ID is an AG-1. There is a WWN-1-P1-1 that is an element of an aggregate B in the access group. Moreover, the element (WWN-1-C2-1, WWN-L2) is included in an access group in which an access group ID is an AG-2. There is a WWN-1-P2-1 that is an element of an aggregate B in the access group. Consequently, in the present embodiment, since there is an element of an aggregate B that is included in the same access group to all elements of the aggregate A, transit to (step 204).
(Step 204)

Permit an access to terminate a processing.
(Step 205)

Inhibit an access to terminate a processing.

By the above steps, a processing of an access enable/disable judgment is completed.

By an access enable/disable judgment processing, it can be possible to prevent an application program from being executed on an incorrect server computer or a server computer that is illegally coupled to a network.

[Embodiment 2]

In an embodiment 2, a processing of canceling a path in the case in which an application program is stopped will be described.

FIG. 15 is a view showing a configuration of a computer system in accordance with a second embodiment.

Similarly to the computer system in accordance with the first embodiment, a computer system in accordance with the second embodiment is configured by a server computer 10, a storage apparatus 50, and a management computer 70. The server computer 10 and the storage apparatus 50 are coupled to each other via a storage network 1000. The management computer 70 is coupled to the server computer 10 and the storage apparatus 50 via a storage network 2000.

Here, configuration elements equivalent to those illustrated in FIG. 1 in accordance with the first embodiment are numerically numbered similarly and the detailed descriptions of the equivalent configuration elements are omitted.

FIG. 16 is a view showing a detailed configuration of a server computer 10 in accordance with the second embodiment.

Similarly to the server computer in accordance with the first embodiment, a server computer 10 in accordance with the second embodiment is configured by physical resources such as a physical HBA 11, a CPU 12, a memory 13, a communication device 14, and a nonvolatile memory 15.

Here, configuration elements equivalent to those illustrated in FIG. 3 in accordance with the first embodiment are numerically numbered similarly and the detailed descriptions of the equivalent configuration elements are omitted.

An application stop program 156 is newly stored into a nonvolatile memory 15.

The application stop program 156 is a program for stopping an application program via a hypervisor 151 corresponding to a request from a management computer 70.

Moreover, an application start program 153 can be stored into the nonvolatile memory 15.

FIG. 17 is a view showing a processing flow of a path cancel processing in an application program stop.

Each step will be described in the following.

(Step 301)

A management computer 70 receives a stop request of an application program. The stop request includes the information that can specify an AP_ID that is included in the application management information 714 shown in FIG. 8 and the information that can specify a server ID that is included in FIG. 9. The stop request of an application program is issued from a program provided with a GUI and a program provided with a CLI.

(Step 302)

Stops an execution of an application program that is specified by the AP_ID on the server ID. The stop of an execution of an application program is carried out by instructing an application stop program 156 of a server computer 10 that is specified by the server ID by the application management program 713 of a management computer 70.

(Step 303)

Cancels a server resource allocation that includes a logical HBA related to an execution of an application program that is specified by the AP_ID of a server computer 10 that is specified by the server ID. The cancellation of a server resource allocation is carried out by instructing a resource management program 152 of a server computer 10 that is specified by the server ID by the configuration management program 712 of the management computer 70.

(Step 304)

Cancels a storage path to a server computer 10 that is specified by the server ID to terminate a processing. The cancellation of a storage path is carried out by instructing a storage resource management program 571 of a storage apparatus 50 by the configuration management program 712 of the management computer 70.

By the above steps, a stop processing of an application program is completed.

After that, an application program can be started by the method described in the embodiment 1 and a path can be configured again.

[Embodiment 3]

In the embodiment 3, a processing for a migration of an application to a server computer having a different configuration will be described.

FIG. 18 is a view showing a configuration of a computer system in accordance with a third embodiment.

A computer system in accordance with the third embodiment is configured by a server computer 10, a server computer 30, a storage apparatus 50, and a management computer 70. The server computer 10, the server computer 30, the storage apparatus 50, are coupled to each other via a storage network 1000. The server computer 10 and the storage apparatus 50 are coupled to each other via a storage network 1002. Moreover, the management computer 70 is coupled to the server computer 10, the server computer 30, and the storage apparatus 50 via a network 2000. As shown in FIG. 18, a path can be made redundant by using a storage network 1001. The storage network 1001 and the storage network 1002 can be in the same type or different types. The storage network is a SAN (Storage Area Network) for instance.

The server computer 10 is configured by physical resources equivalent to those of a server computer 10 shown in FIG. 1 of the first embodiment or FIG. 15 of the second embodiment, such as a physical HBA11, a CPU12, a memory 13, a communication device 14, and a nonvolatile memory 15.

Moreover, the server computer 30 is also configured by physical resources equivalent to those of a server computer 10 shown in FIG. 1 of the first embodiment or FIG. 15 of the second embodiment. Therefore, the figure of the server computer 30 is omitted.

The server computer 50 is configured by physical resources equivalent to those of a server computer 10 shown in FIG. 1 of the first embodiment or FIG. 15 of the second embodiment, such as a CHA 51, a CPU 52, a memory 53, a physical disk 55, a communication device 56, a nonvolatile memory 57, and a control device 58. Therefore, the figure of the server computer 50 is omitted.

The management computer 70 is configured by physical resources equivalent to the management computer 70 shown in FIG. 1 of the first embodiment or FIG. 15 of the second embodiment, such as a nonvolatile memory 71, a communication device 72, a CPU 73, and a memory 74. Therefore, the figure of the management computer 70 is omitted.

FIG. 19 is a view showing a detailed configuration of a server computer 10 in accordance with the third embodiment.

As described above, the server computer 10 is configured by physical resources equivalent to those of a server computer 10 of the first embodiment or of the second embodiment, such as a physical HBA 11, a CPU 12, a memory 13, a communication device 14, and a nonvolatile memory 15.

Here, configuration elements equivalent to those illustrated in FIG. 1 in accordance with the first embodiment or FIG. 15 in accordance with the second embodiment are numerically numbered similarly and the detailed descriptions of the equivalent configuration elements are omitted.

An application suspend program 157, an application restart program 158, and a resource state take over program 159 are newly stored into a nonvolatile memory 15.

The application suspend program 157 is a program for a suspend of an execution of an application program via a hypervisor 151 corresponding to a request from a management computer 70.

The application restart program 158 is a program for a restart of an execution of an application program via a hypervisor 151 corresponding to a request from a management computer 70.

The resource state take over program 159 is a program for taking over a resource state via a hypervisor 151 corresponding to a request from a management computer 70.

FIG. 20 is a view showing a detailed configuration of a management computer 70 in accordance with the third embodiment.

As described above, the management computer 70 is configured by physical resources equivalent to those of the first embodiment or of the second embodiment, such as a nonvolatile memory 71, a communication device 72, a CPU 73, and a memory 74.

Here, configuration elements equivalent to those illustrated in FIG. 3 in accordance with the first embodiment or FIG. 15 in accordance with the second embodiment are numerically numbered similarly and the detailed descriptions of the equivalent configuration elements are omitted.

The nonvolatile memory 71 newly stores an application migration program 719.

The application migration program 719 is a program for providing an operation for a migration of an application program between server computers. The application migration program 719 carries out a migration of an application program by instructing an execution suspend of a to a migration source server computer, taking over a resource state from a migration source server computer to a migration destination server computer, and an execution restart of an application program to a migration destination server computer.

FIG. 21 is a view showing a processing flow of a path configuration processing in an application program migration.

Each step will be described in the following.

(Step 401)

The management computer 70 receives a migration request of an application program. The start request includes the information that can specify an AP_ID that is the identification information of an application program that is started and a server ID 715a1 that is the identification information of a server computer of a migration source and a migration destination. The AP_ID7141 is the information that is included in the application management information 714 shown in FIG. 8. The server ID 715a1 is the information that is included in the server configuration information 715 shown in FIG. 9. The start request includes the information of a CPU frequency and a memory size that are required for migration destination computer to start an application program. The migration request of an application program is issued from a program provided with a GUI and a program provided with a CLI.

(Step 402)

Judges whether or not the specified CPU processing time and a memory size can be allocated from a server computer that is specified by a server ID of the migration destination.

In the case in which the specified CPU processing time and a memory size can be allocated, go to (step 403). In the case in which the specified CPU processing time and a memory size cannot be allocated, transit to (step 411).

(Step 403)

It is judged whether or not a path to a storage area into which an instance of an application program or a virtual computer that is specified by the AP_ID and that are included in the application management information that is specified by the AP_ID is stored can be created from the server computer that is specified by the server ID of the migration destination. Moreover, it is judged whether or not a path to a storage area into which data that is used by an instance of an application program that is specified by an AP_ID or a virtual computer is stored can be created.

The judgment processing is equivalent to the case of (Step 103) of FIG. 13, the summary of the judgment processing will be described in the following (1) to (5), and detailed examples are omitted.

(1) Acquires the identification information of a storage apparatus and an LU that is used by an application program from the identification information of an application program.
(2) Specifies a WWN of a channel adapter of a storage apparatus that is used from the identification information of an acquired storage apparatus.
(3) Acquires a WWN of a physical HBA of a used server from the identification information of a server of a migration destination of an application that has been received by a start request.
(4) Retrieves a physical connection relationship between an HBA of a server and a port of a storage.
(5) Retrieves a physical HBA of a migration destination server computer that is included in a port connection group.

In the case in which there is a physical HBA, a path can be created. In the case in which a path can be created, go to (Step 404). In the case in which a path cannot be created, transit to (Step 411).

(Step 404)

Configures a storage path to a migration destination server computer in the above paths. The configuration of a storage path is carried out by instructing a storage resource management program 571 of a storage apparatus 50 for a configuration management program 712 of a management computer 70. Here, since (Step 404) is equivalent to a processing of (Step 104), the detailed descriptions of the processing are omitted.

(Step 405)

Suspends the execution of an application program by a migration source server computer. The execution suspend of an application program is carried out by instructing a storage resource management program 571 of a migration source server computer for an application migration program 719 of a management computer 70.

(Step 406)

Allocates the server resources that include a logical HBA of a migration destination server computer in the above paths. The allocation of a server resource is carried out by instructing a resource management program 152 of a server computer for a configuration management program 712 of a management computer 70. Here, since (Step 406) is equivalent to a processing of (Step 105) of FIG. 13, the detailed descriptions of the processing are omitted.

(Step 407)

Takes over a resource state of an application program execution environment in a migration source server computer to a migration destination server computer. Taking over of a resource state is carried out by instructing a resource state take over program 159 of a migration source server computer for a application migration program 719 of a management computer 70.

(Step 408)

Restarts an execution of an application program in a migration destination server computer. The execution restart of an application program is carried out by instructing an application restart program 158 of a migration destination server computer for an application migration program 719 of a management computer 70.

(Step 409)

Cancels an allocation of the server resources that include a logical HBA of a migration source server computer. The cancellation of a server resource allocation is carried out by instructing a resource management program 152 of a migration source server computer for a configuration management program 712 of a management computer 70.

(Step 410)

Cancels a storage path to a migration source server computer to terminate the processing. The cancellation of a storage path is carried out by instructing a storage resource management program 571 of a storage apparatus 50 for a configuration management program 712 of a management computer 70.

(Step 411)

Returns a start impossible error to a request issuing resource to terminate the processing.

By the above steps, a migration from a migration source server computer of an instance of an application program to a migration destination computer is completed.

Even in the case in which the specifications that includes the number of physical resources such as a physical HBA, a CPU, and a memory that are included in the migration source server computer and the migration destination server computer are different, a migration can be carried out by detecting a path.

By the processing of the embodiment 3, a path that is required for operating an application program can be dynamically reconstructed corresponding to a migration of an application program without configuring a path in advance.

The access enable/disable judgment that has been described in the embodiment 1 can be carried out after a migration of an application. Consequently, an illegal access can be prevented even in the case of a migration of an application to a different server.

What is claimed is:

1. A storage management system comprising:
   a first server computer;
   a storage apparatus that is coupled to the first server computer; and
   a management computer that is coupled to the first server computer and the storage apparatus,
   wherein the first server computer creates a virtual computer on the first server computer,
   wherein the storage apparatus creates a logical unit, and
   wherein, when an application program to be executed on the virtual computer is started up for the first server computer after the virtual computer and the logical unit have been created, the management computer configures a path with the virtual computer and the logical unit based on a correspondence relationship between the identification information of the virtual computer and the identification information of the logical unit that is allocated to the virtual computer in the case in which the application program to be executed on the virtual computer is started for the first server computer,
   wherein a determination as to whether or not to permit access is executed upon startup of the application program, and an application is started up when access is permitted,
   wherein resources to be allocated to the virtual computer and the logical unit are allocated when the application to be executed on the virtual computer is started up, the resources including allocating an access group and a port connection group, and wherein information contained in the access group and the port connection group is utilized when determining whether or not to permit access,
   wherein, upon startup of the application program to be executed on the virtual computer, the management computer detects an I/O adapter that can be coupled between the server computer and the storage apparatus based on a connection relationship between a port of the storage apparatus that is allocated to the logical unit and the I/O adapter of the first server computer, and configures a path with the logical unit of the storage apparatus and the virtual computer that is operated on the first server computer, and
   wherein the first server computer is coupled to a second server computer, the second server computer is coupled to the storage apparatus and the management computer, the management computer specifies the identification information of the storage apparatus's port that is allocated to the logical unit from the identification information of the virtual computer that is operated on the first server computer and the identification information of the logical unit that is allocated to the virtual computer, and the management computer configures a path with the storage apparatus and the second server computer based on a connection relationship between the port that is allocated to the logical unit and the I/O adapter of the second server computer.

2. The storage management system according to claim 1, wherein: the management computer is provided with a correspondence relationship among: a) the identification information of the I/O adapter of the first server computer, b) the identification information of the I/O adapter in which an I/O adapter of the first server computer is virtualized, and c) the identification information of the port of the storage apparatus that is allocated to the logical unit, and wherein an access from the virtual computer to the logical unit is permitted in the case in which the correspondence relationship provided to the management computer is equal to a correspondence relationship among the identification information of the I/O adapter of the first server computer in which the path is configured, the identification information of the I/O adapter in which an I/O adapter of the first server computer is virtualized, and the identification information of the storage apparatus's port that is allocated to the logical unit.

3. The storage management system according to claim 2, wherein the management computer cancels the configured path in the case in which the virtual computer is stopped.

4. The storage management system according to claim 1, wherein the virtual computer that is operated on the first server computer is stopped and the virtual computer is started on the second server computer after the path is configured.

5. The storage management system according to claim 4, wherein the path with the first server computer and the storage apparatus is canceled after the virtual computer is started on the second server computer.

6. A storage management method for a system that includes a first server computer; a storage apparatus that is coupled to the first server computer; a second server computer that is coupled to the first server computer and to the storage apparatus, and a management computer that is coupled to the first server computer, the second server computer, and the storage apparatus, the method comprising the steps of:
   creating a virtual computer on the first server computer by the first server computer;
   creating a logical unit by the storage apparatus;
   starting up an application program to be executed on the virtual computer for the first server computer;
   configuring a path with the virtual computer and the logical unit by the management computer based on a correspondence relationship between the identification information of the virtual computer and the identification information of the logical unit that is allocated to the virtual computer in the case in which the application program to be executed on the virtual computer is started for the first server computer;
   determining whether or not to permit access upon startup of the application program, and starting up an application when access is permitted;
   when access is permitted, allocating resources to the virtual computer and the logical unit, the resources including allocating an access group and a port connection group, wherein information contained in the access group and the port connection group is utilized when determining whether or not to permit access,
   detecting, by the management computer upon startup of the application program to be executed on the virtual computer, an I/O adapter that can be coupled between the server computer and the storage apparatus based on a connection relationship between a port of the storage apparatus that is allocated to the logical unit and the I/O adapter of the first server computer, and configuring a path with the logical unit of the storage apparatus and the virtual computer that is operated on the first server computer, specifying, by the management computer, the identification information of the storage apparatus's port that is allocated to the logical unit from the identification information of the virtual computer that is operated on the first server computer and the identification information of the logical unit that is allocated to the virtual computer; and configuring, by the management computer, a path with the storage apparatus and the second server computer based on a connection relationship between the port that is allocated to the logical unit and the I/O adapter of the second server computer.

7. The storage management method according to claim 6, further comprising the steps of:

providing the management computer with a correspondence relationship among: a) the identification information of the I/O adapter of the first server computer, b) the identification information of the I/O adapter in which an I/O adapter of the first server computer is virtualized, and c) the identification information of the port of the storage apparatus that is allocated to the logical unit, and permitting an access from the virtual computer to the logical unit in the case in which the correspondence relationship provided to the management computer is equal to a correspondence relationship among the identification information of the I/O adapter of the first server computer in which the path is configured, the identification information of the I/O adapter in which an I/O adapter of the first server computer is virtualized, and the identification information of the port of the storage apparatus that is allocated to the logical unit.

8. The storage management method according to claim 7, wherein further comprising the steps of:

stopping the virtual computer; and canceling, by the management computer, the configured path.

9. The storage management method according to claim 6, wherein the virtual computer that is operated on the first server computer is stopped and the virtual computer is started on the second server computer after the path is configured.

10. The storage management method according to claim 9, wherein the path with the first server computer and the storage apparatus is canceled after the virtual computer is started on the second server computer.

* * * * *